(12) United States Patent
Lee et al.

(10) Patent No.: US 7,460,454 B2
(45) Date of Patent: *Dec. 2, 2008

(54) METHOD AND APPARATUS FOR MANAGING DISC DEFECT USING TEMPORARY DFL AND TEMPORARY DDS INCLUDING DRIVE & DISC INFORMATION DISC WITH TEMPORARY DFL AND TEMPORARY DDS

(75) Inventors: Kyung-geun Lee, Gyeonggi-do (KR); Jung-wan Ko, Gyeonggi-do (KR); Sung-hee Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/430,037

(22) Filed: May 9, 2006

(65) Prior Publication Data

US 2006/0206755 A1    Sep. 14, 2006

Related U.S. Application Data

(63) Continuation of application No. 11/221,771, filed on Sep. 9, 2005, which is a continuation of application No. 10/786,001, filed on Feb. 26, 2004.

(30) Foreign Application Priority Data

| Mar. 3, 2003 | (KR) | ................................ 2003-12953 |
| Mar. 17, 2003 | (KR) | ................................ 2003-16495 |
| Jan. 29, 2004 | (KR) | ................................ 2004-5640 |

(51) Int. Cl.
 *G11B 7/00* (2006.01)

(52) U.S. Cl. ................ 369/53.17; 369/53.16; 369/47.14

(58) Field of Classification Search .............. 369/47.14, 369/53.15, 53.16, 53.17; 714/8, 711
See application file for complete search history.

(56) References Cited

U.S. PATENT DOCUMENTS 5,404,357 A * 4/1995 Ito et al. ..................... 714/719

(Continued)

FOREIGN PATENT DOCUMENTS

| JP | 07-311942 | 11/1995 |
| KR | 1997-9668 | 10/1997 |
| KR | 1997-67160 | 10/1997 |
| KR | 2000-24996 | 5/2000 |
| KR | 2000-67652 | 11/2000 |
| KR | 2001-111248 | 12/2001 |
| KR | 2003-76542 | 9/2003 |
| WO | WO 01/22416 | 3/2001 |
| WO | WO 2004/064064 | 7/2004 |

OTHER PUBLICATIONS

U.S. Appl. No. 10/663,981, filed Sep. 17, 2003, Ko et al., Samsung Electronics Co., Ltd.

(Continued)

*Primary Examiner*—Joseph H. Feild
*Assistant Examiner*—Tawfik Goma
(74) *Attorney, Agent, or Firm*—Stein, McEwen & Bui, LLP

(57) ABSTRACT

A write once disc includes a defect management area that is present in at least one of a lead-in area and a lead-out area; a temporary defect management area that is present in at least one of the lead-in area and the lead-out area; and a drive & disc information area that is present in at least one of the lead-in area and the lead-out area. Information regarding the locations of temporary defect information and temporary defect management information is recorded in the drive & disc information area, the temporary defect information and temporary defect management information, which includes drive & disc information, are recorded in the temporary defect management area, and temporary defect information and temporary defect management information, which are lastly recorded in the temporary defect management area, are recorded in the defect management area for disc finalization.

11 Claims, 18 Drawing Sheets

U.S. PATENT DOCUMENTS

| | | | |
|---|---|---|---|
| 5,592,452 | A | 1/1997 | Yoshimoto et al. |
| 5,715,221 | A * | 2/1998 | Ito et al. .................. 369/47.14 |
| 6,160,778 | A | 12/2000 | Ito et al. |
| 6,367,038 | B1 * | 4/2002 | Ko ............................ 714/710 |
| 6,493,302 | B2 | 12/2002 | Takahashi |
| 6,552,982 | B1 | 4/2003 | Fukushima et al. |
| 6,564,345 | B1 * | 5/2003 | Kim et al. .................. 714/723 |
| 6,754,860 | B2 | 6/2004 | Kim et al. |
| 6,978,404 | B2 * | 12/2005 | Ueda et al. ................. 714/710 |
| 2002/0136118 | A1 * | 9/2002 | Takahashi ............... 369/47.14 |
| 2003/0179669 | A1 | 9/2003 | Takahashi et al. |
| 2004/0062159 | A1 | 4/2004 | Park et al. |
| 2004/0090888 | A1 * | 5/2004 | Park et al. ............... 369/47.14 |
| 2004/0145980 | A1 | 7/2004 | Park et al. |
| 2004/0158768 | A1 * | 8/2004 | Park et al. ..................... 714/7 |
| 2004/0174793 | A1 | 9/2004 | Park et al. |

OTHER PUBLICATIONS

U.S. Appl. No. 10/670,363, filed Sep. 26, 2003, Hwang, Samsung Electronics Co., Ltd.
U.S. Appl. No. 10/638,555, filed Aug. 12, 2003, Ko et al., Samsung Electronics Co., Ltd.
U.S. Appl. No. 10/786,001, filed Feb. 26, 2004, Kyung-Geun Lee et al., Samsung Electronics Co., Ltd.
U.S. Appl. No. 11/221,771, filed Sep. 9, 2005, Kyung-Geun Lee et al., Samsung Electronics Co., Ltd.
U.S. Appl. No. 11/418,185, filed May 5, 2006, Kyung-Geun Lee et al., Samsung Electronics Co., Ltd.
U.S. Appl. No. 11/430,163, filed May 9, 2006, Kyung-Geun Lee et al., Samsung Electronics Co., Ltd.
Search Report issued on Aug. 14, 2007 by the Australian Patent Office for Singapore Divisional Patent Application No. 200609101-1.

* cited by examiner

METHOD AND APPARATUS FOR MANAGING DISC DEFECT USING TEMPORARY DFL AND TEMPORARY DDS INCLUDING DRIVE & DISC INFORMATION DISC WITH TEMPORARY DFL AND TEMPORARY DDS

CROSS-REFERENCE TO RELATED APPLICATIONS

This application is a continuation application of U.S. patent application Ser. No. 11/221,771, filed Sept. 9, 2005, currently pending, which is a continuation application of U.S. patent application Ser. No. 10/786,001, filed Feb. 26, 2004, currently pending, which claims the benefit of Korean Patent Application No. 2003-12953, filed on Mar. 3, 2003 in the Korean Intellectual Property Office, Korean Patent Application No. 2003-16495, filed on Mar. 17, 2003 in the Korean Intellectual Property Office, and Korean Patent Application No. 2004-5640, filed on Jan. 29, 2004 in the Korean Intellectual Property Office, the disclosures of which are incorporated herein in their entirety by reference.

BACKGROUND OF THE INVENTION

1. Field of the Invention

The present invention relates to disc defect management, and more particularly, to a disc with a temporary defect management area in which drive & disc information is recorded, and a disc defect management method and apparatus therefor.

2. Description of the Related Art

Disc defect management is the process of rewriting data stored in a user data area of a disc in which a defect exists to a new portion of the disc's data area, thereby compensating for data loss otherwise caused by the defect. In general, disc defect management is performed using a linear replacement method or a slipping replacement method. In the linear replacement method, a user data area in which a defect exists is replaced with a spare data area having no defects. In the slipping replacement method, a user data area with the defect is slipped and the next user data area having no defects is used.

Both linear replacement and slipping replacement methods are, however, applicable only to discs such as a DVD-RAM/RW, on which data can be repeatedly recorded and recording can be performed using a random access method. In other words, the conventional linear and slipping replacement methods cannot be applied to write once discs on which recording is allowed only once. Specifically, the presence of defects in a disc is generally detected by recording data on the disc and confirming whether the data has been recorded correctly on the disc. However, once the data is recorded on a write once disc, it is impossible to overwrite new data and manage defects therein.

After the development of write once discs Compact Disc (CD)-R and Digital Versatile Disc (DVD)-R, a high-density write once disc with a recording capacity of several dozen GBs has been introduced. This type of disc can be used as a backup disc since it is not expensive and allows random access that enables fast reading operations. However, disc defect management is not available for write once discs. Therefore, a backup operation may be discontinued when a defective area (i.e., an area where a defect exists) is detected during the backup operation. Further, the backup operation is performed when a system is not frequently used (e.g., at night) when a system manager does not operate the system. In this case, it is more likely that the backup operation will be discontinued because a defective area of a write once disc is detected.

Meanwhile, when additional data will not be recorded on a recordable disc (i.e., when only data reproduction will be allowed), write protect information is recorded on the disc to prevent the data recorded on the disc from being mistakenly erased. However, once the write protect information is recorded, recording is not further allowed, and, thus, possible disc defects cannot be managed. That is, since recording is not allowed in a data area of the disc after recording of the write protect information, disc defect management also cannot be performed.

SUMMARY OF THE INVENTION

An aspect of the present invention provides a write once disc, and a disc defect management method and apparatus therefor.

An aspect of the present invention also provides a write once disc and a disc defect management method and apparatus that can manage disc defects even when a disc defect is detected during a recording operation, allowing the recording operation to be performed without interruption.

An aspect of the present invention also provides a disc on which already-recorded write protect information can be changed, and a disc defect management method and apparatus therefor.

An aspect of the present invention also provides a disc on which disc defect management is allowed even after recording of write protect information, and a disc defect management method and apparatus therefor.

An aspect of the present invention also provides a disc, and a disc defect management method and apparatus that can increase a reliability of data stored in a disc.

Additional aspects and/or advantages of the invention will be set forth in part in the description which follows and, in part, will be obvious from the description, or may be learned by practice of the invention.

According to an aspect of the present invention, a write once disc includes a single record layer having, sequentially, a lead-in area, a data area, and a lead-out area, a defect management area in at least one of the lead-in area and the lead-out area, a temporary defect management area in at least one of the lead-in area and the lead-out area, and a drive & disc information area in at least one of the lead-in area and the lead-out area, where information regarding locations of temporary defect information and temporary defect management information is recorded in the drive & disc information area, the temporary defect information and temporary defect management information, which includes drive & disc information, are recorded in the temporary defect management area, and temporary defect information and temporary defect management information, which are last recorded in the temporary defect management area, are recorded in the defect management area during finalization of the disc.

According to another aspect of the present invention, a write once disc has a first record layer having, sequentially, a lead-in area, a data area, and a lead-out area, a second record layer having, sequentially, an outer area, a data area, and a lead-out area, a defect management area in at least one of the lead-in area, the lead-out area, and the outer area; a temporary defect management area in at least one of the lead-in area, the lead-out area, and the outer area; and a drive & disc information area in at least one of the lead-in area, the lead-out area, and the outer area, where temporary defect information and temporary defect management information, which includes drive & disc information, are recorded in the temporary defect management area, temporary defect information and temporary defect management information, which are last recorded in the temporary defect management area, are recorded in the defect management area, for disc finalization, and information regarding the locations of the temporary defect information and temporary defect management information is recorded in the drive & disc information area.

According to an aspect of the invention, write protect information is further recorded in the drive & disc information area and recorded for every recording operation.

According to an aspect of the invention, the drive & disc information includes at least one of the write protect information and test location information.

According to yet another aspect of the present invention, a method of managing disc defects includes recording information regarding a defect in data, which is recorded in a data area of a disc according to an ith recording operation, as ith temporary defect information several times in a temporary defect management area of the disc; recording information for managing the ith temporary defect information as ith temporary defect management information in the temporary defect management area; recording information regarding locations of the ith temporary defect information and the temporary defect management information in a drive & disc information area of the disc; repeating the recording the ith temporary defect information, recording the ith temporary defect management information, and the recording information regarding the locations at least once while increasing an index i given to each subsequent recording operation, the temporary defect information, and the temporary defect management information; and recording a last recorded temporary defect information and temporary defect management information in a defect management area of the disc for disc finalization.

According to an aspect of the invention, the method further includes recording write protect information in the drive & disc information area.

During the recording the first temporary defect management information, the ith temporary defect management information is recorded to include at least one of test location information and the write protect information.

According to still another aspect of the present invention, a recording and/or reproducing apparatus includes a recording/reading unit that records data on or reads data from a disc; and a controller that controls the recording/reading unit to record data in a data area of the disc and information regarding a defect in the data recorded in the data area as temporary defect information in a temporary defect management area; to record management information for managing the temporary defect information as temporary defect management information in the temporary defect management area, the management information further including drive & disc information; to record information regarding locations of the temporary defect information and the temporary defect management information in a drive & disc information area of the disc; and to record a last recorded temporary defect information and temporary defect management information in a defect management area of the disc during disc finalization.

According to an aspect of the invention, the controller controls the recording/reading unit to further record write protect information in the drive & disc information, controls the recording/reading unit to record the temporary defect information and the temporary defect management information for each recording operation, and controls the recording/reading unit to record the temporary defect management information to include test location information and write the protect information for each recording operation.

BRIEF DESCRIPTION OF THE DRAWINGS

The above and/or other aspects and advantages of the present invention will become more apparent and more readily appreciated by describing in detail embodiments thereof with reference to the accompanying drawings in which.

DETAILED DESCRIPTION OF THE EMBODIMENTS

Figure 1:
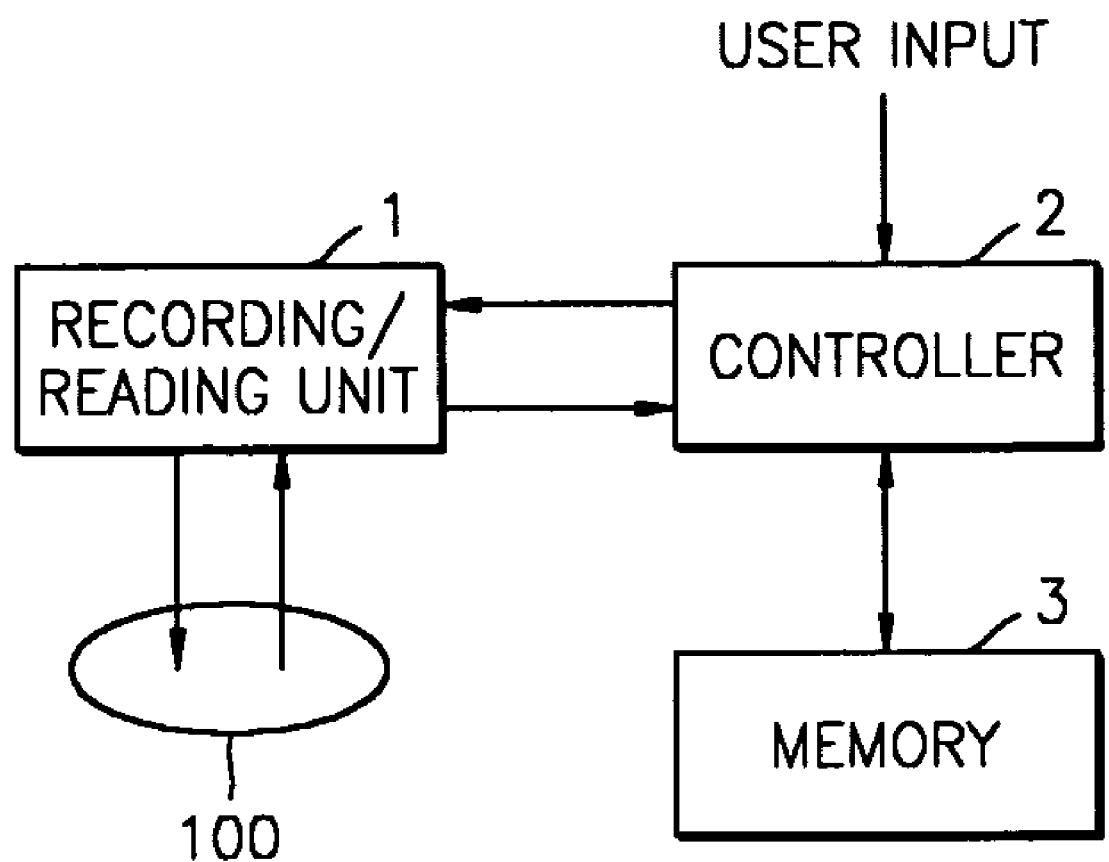
FIG. 1 is a block diagram of a recording and/or reproducing apparatus according to an embodiment of the present invention.

Hereinafter, embodiments of the present invention will be described in a greater detail with reference to the accompanying drawings, wherein like reference numerals refer to the like elements throughout. The embodiments are described below in order to explain the present invention by referring to the figures.

FIG. 1 is a block diagram of a recording and/or reproducing apparatus according to an embodiment of the present invention. Referring to FIG. 1, the recording and/or reproducing apparatus includes a recording/reading unit 1, a controller 2, and a memory 3. The recording/reading unit 1 records data on a disc 100, which is an information storage medium according to an embodiment of the present invention the recording/reading unit 1 also reads back the data from the disc 100 to verify the accuracy of the recorded data. The controller 2 performs disc defect management according to an embodiment of the present invention and controls the recording/reading unit 1 to record write protect information on the disc 100. In this embodiment, the controller 2 uses a verify-after-write method in which data is recorded on the disc 100 in predetermined units of data and the accuracy of the recorded data is verified to detect if an area of the disc 100 has a defect.

Specifically, the controller 2 records user data on the disc 100 in units of recording operations, and verifies the recorded user data to detect an area of the disc 100 in which a defect exists. Thereafter, the controller 2 creates information that indicates a position of the area with the defect, and stores the created information in the memory 3. When the stored information reaches a predetermined amount, the controller 2 records the stored information as temporary defect information on the disc 100. If a user will not perform the disc defect management, the controller 2 records only the temporary defect management information (which will be explained below) on the disc 100.

Generally, the recording operation is an operation unit determined according to a user's intention or is a recording work to be performed. According to the shown embodiment, a recording operation indicates a process in which the disc 100 is loaded into the recording and/or reproducing apparatus, data is recorded on the disc 100, and the disc 100 is taken out from the recording and/or reproducing apparatus. During the recording operation, data is recorded and verified at least once: In general, the data is recorded and verified several times. Defect information, which is obtained using the verify-after-write method, is temporarily stored as the temporary defect information in the memory 3. However, it is understood that the recording operation can be otherwise defined, and/or that the data does not need to be verified several times in all aspects of the invention.

When a user presses the eject button (not shown) of the recording and/or reproducing apparatus in order to remove the disc 100 after recording of data or when a recording operation is otherwise to end, the controller 2 expects a recording operation to be terminated. Next, the controller 2 reads the information from the memory 3, provides the read information to the recording/reading unit 1, and controls the recording/reading unit 1 to record the read information on the disc 100. Further, as will be explained later, information regarding the temporary defect information and the temporary defect management information, and the write protect information are recorded in a drive & disc information area of the disc 100.

When the recording of data is completed (i.e., additional data will not be recorded on the disc 100 and the disc 100 needs to be finalized), the controller 2 controls the recording/reading unit 1 to rewrite the recorded temporary defect information and temporary defect management information in a defect management area (DMA) of the disc 100 as defect management information.

During reproduction, the controller 2 controls the recording/reading unit 1 to read information regarding a defect in the data recorded in the data area, as temporary defect information from a temporary defect management area (TDMA) of the disc 100. The controller 2 further controls the recording/reading unit 1 to read management information for managing the temporary defect information as temporary defect management information from the TDMA of the disc 100. The read management information includes drive & disc information. The controller 2 controls the recording/reading unit 1 to read information regarding locations of the temporary defect information and the temporary defect management information from a disc & drive information area of the disc 100. Further, in the case that the disc 100 is finalized, the controller 2 controls the recording/reading unit 1 to read a last recorded temporary defect information and a last recorded temporary defect management information from a defect management area (DMA) of the disc 100. The controller 2 also controls the recording/reading unit 1 to read write protect information and test location information from the drive & disc information.

Figure 2A:
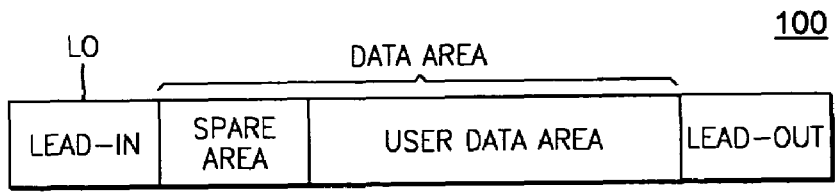
FIGS. 2A through 2D illustrate structures of a disc according to embodiments of the present invention.

FIGS. 2A through 2D illustrate structures of the disc 100 of FIG. 1 according to embodiments of the present invention. FIG. 2A illustrates in detail a disc 100 having a record layer L0 (a single record layer disc). The disc 100 includes a lead-in area, a data area, and a lead-out area. The lead-in area is located in an inner part of the disc 100, and the lead-out area is located in an outer part of the disc 100. The data area is present between the lead-in area and the lead-out area and is divided into a user data area and a spare area. The user data area is an area where user data is recorded. The spare area is a replacement area for a user data area having a defect, and serves to compensate for a loss in the recording area due to the defect. That is, the spare area is used for the disc defect management according to an aspect of the present invention such that, when a defect exists in data recorded in the user data area, the data is recorded again in the spare area.

Figure 2B:
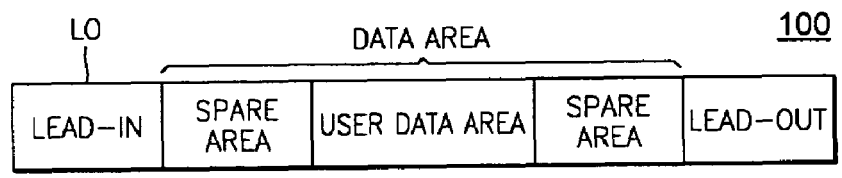

A data structure of the disc 100 shown in FIG. 2B is the same as that of the disc 100 of FIG. 2A except that a data area includes two spare areas. Therefore, a description of each area shown in FIG. 2B will be omitted. In FIG. 2B, the spare areas are located at the sides of the user data area. In the shown embodiment, the spare area between the lead-in area and the user data area will be referred to as an inner spare area, and the spare area between the user data area and the lead-out area will be referred to as an outer spare area. However, it is understood that other spare areas can be used and/or can be disposed in areas other than the inner and outer areas of the user data area.

Figure 2C:
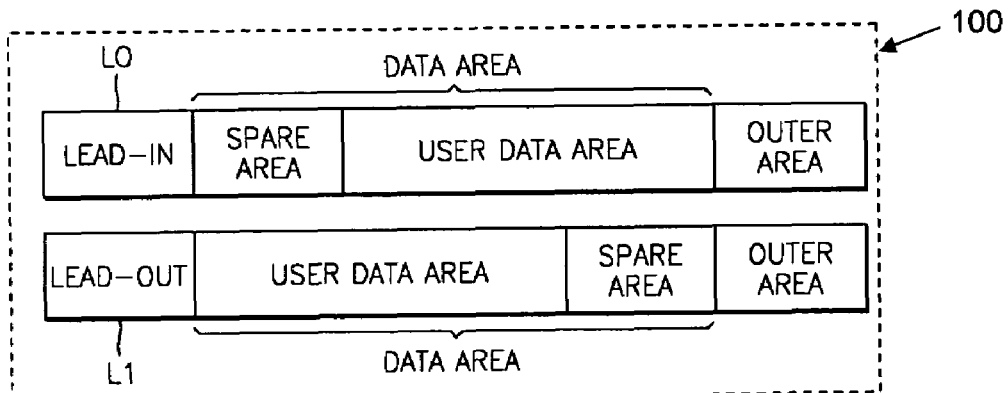

FIG. 2C illustrates a disc 100 having first and second record layers L0 and L1 (a double record layer disc). The first record layer L0 has a lead-in area, a data area, and an outer area sequentially formed from the inner part of the first record layer L0 to the outer part. Also, the second record layer L1 has an outer area, a data area, and a lead-out area sequentially formed from the outer part of the second record layer L1 to the inner part. Unlike the single record layer discs shown in FIGS. 2A and 2B, the lead-out area is present in the inner part of the disc 100 of FIG. 2B. That is, the disc 100 of FIG. 2B has an opposite track path (OTP) in which data is recorded starting from the lead-in area of the first record layer L0 toward its outer area and continuing from the outer area of the second record layer L1 to its lead-out area. A spare area is allotted to each of the record layers L0 and L1.

Figure 2D:
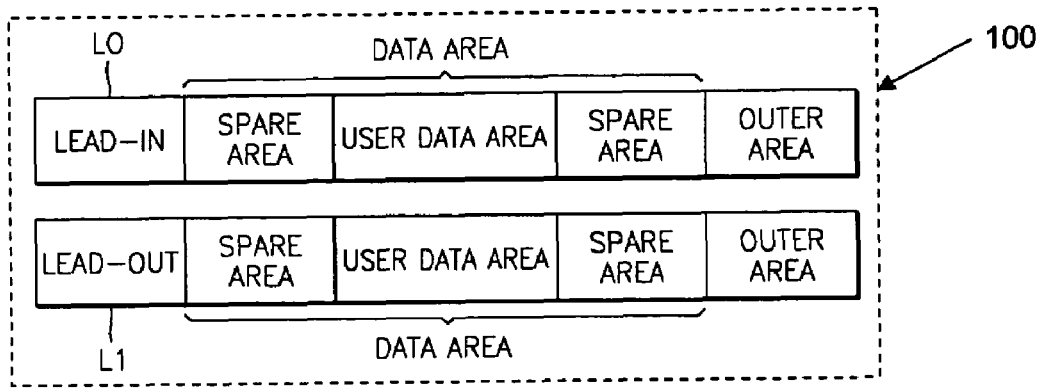

A data structure of the disc 100 shown in FIG. 2D is the same as that of the disc 100 of FIG. 2C, except that the first record layer L0 and the second record layer L1 each further include another spare area such that the disc 100 includes four spare areas. Therefore, a description of each spare area will be omitted here. The spare areas are formed at the sides of the user data areas of the first and second record layers L0 and L1. In this disclosure, the spare areas adjacent to an inner part of the disc 100 will be referred to as inner spare areas and the spare areas adjacent to an outer part of the disc 100 will be referred to as outer spare areas. If necessary, a portion of the user data area may be used as another spare area. The location and numbers of the spare area are not limited to the above description.

Figure 3A:
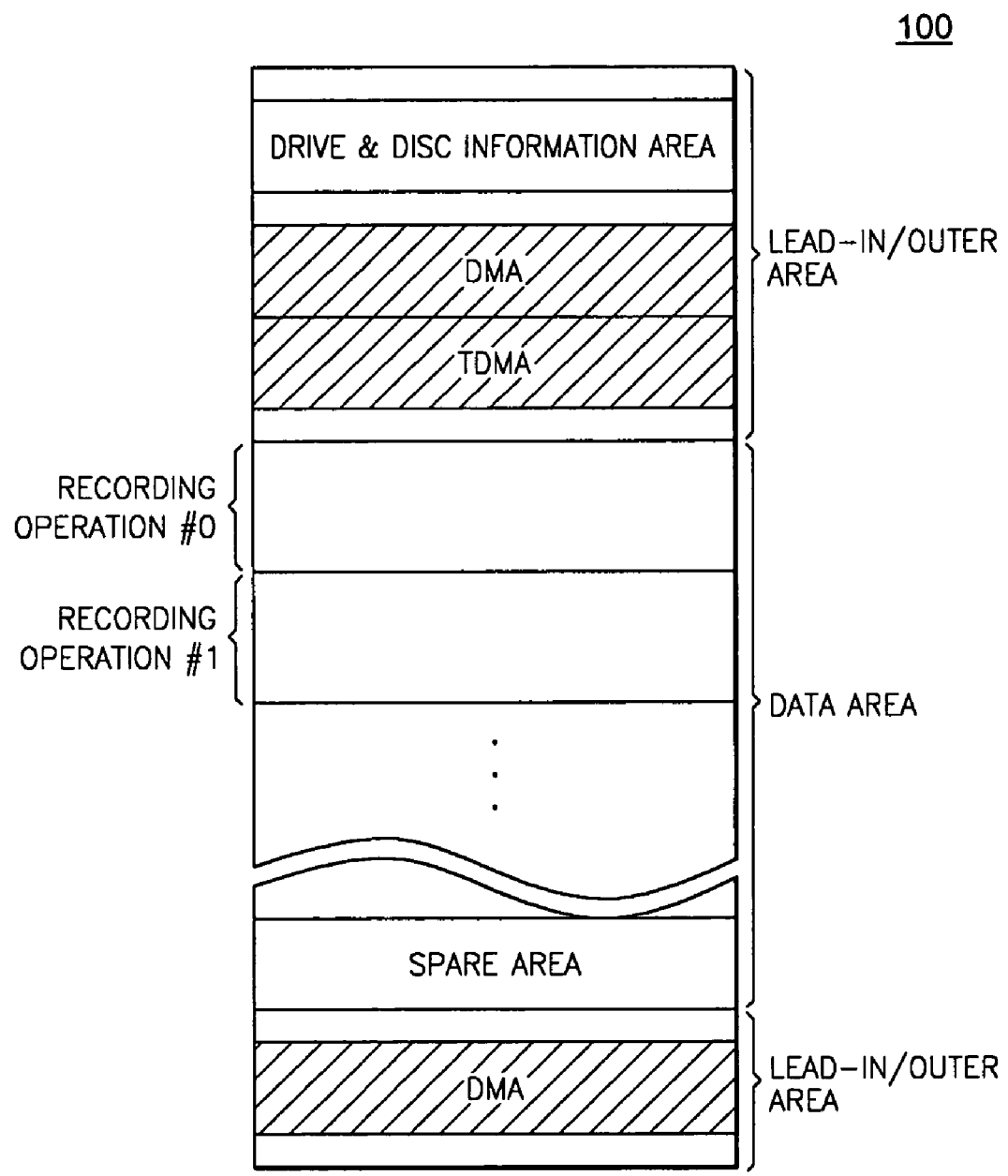
FIG. 3A illustrates a data structure of the disc shown in FIGS. 2A through 2D according to an embodiment of the present invention.

FIG. 3A illustrates structures of the disc 100 of FIGS. 2A through 2D, according to an embodiment of the present invention. Referring to FIG. 3A, if the disc 100 is a single record layer disc 100 shown in FIGS. 2A and 2B, a drive & disc information area, a DMA, and a temporary DMA (TDMA) are present in at least one of the lead-in area and the lead-out area of the disc 100. If the disc 100 is a double record layer disc 100 shown in FIGS. 2C and 2D, the drive & disc information area, the DMA, and the TDMA are present in at least one of the lead-in area, the lead-out area, and the outer area, and preferably are in the lead-in area and the lead-out area, which are located in the inner part of the disc 100, respectively. However, it is understood that the drive & disc information area can be otherwise located in other aspects of the invention.

In the drive & disc information area, there are recorded information regarding a drive used for a write and/or read operation, information regarding a disc (e.g., whether the disc is a single record layer disc or a double record layer disc), and information regarding a location of a test area where recording conditions are tested. In particular, the disc information specifies disc defect management according to an aspect of the present invention. For instance, the disc information may include location information regarding temporary defect information and temporary defect management information, and the write protect information. However, it is understood that the drive & disc information area could include additional information related to the drive & disc information.

In general, the DMA includes information relating to managing disc defects in the disc 100. Such information includes the structure of the disc 100 for disc defect management, the recording position of defect information, whether defect management is performed or not, and the position and size of a spare area. In the TDMA, information regarding disc defects is recorded before disc finalization. The information regarding disc defects includes the drive & disc information (i.e., the information regarding the location of the test area and the write protect information).

In general, when the disc 100 is loaded into a recording/reading apparatus such as that shown in FIG. 1, the apparatus reads data from a lead-in area and a lead-out area of the disc 100 to determine how to manage the disc 100 and record data on or read data from the disc 100. However, if the amount of data recorded in the lead-in area and/or the lead-out area increases, a longer time is spent on preparing the recording or reproducing of data after the loading of the disc 100. To solve this problem, an aspect of the present invention uses temporary defect management information and temporary defect information that are to be recorded in the TDMA. The TDMA is allotted to the lead-in area and/or the lead-out area of a disc, being separated from the DMA. That is, when additional data will not be recorded on the disc (i.e., disc finalization is required), only a last recorded defect information and defect management information are recorded in the DMA, thus enabling the recording/reading apparatus to read only the last recorded defect management information from the DMA. Accordingly, it is possible to accelerate disc initialization. Further, since the defect management information is recorded in a plurality of areas, the reliability of information can be increased.

According to an aspect of the present invention, the defect management information, the location information regarding the temporary defect information and the temporary defect management information, and the write protect information are recorded in the drive & disc information area. Accordingly, the recording/reading apparatus reads the location information from the drive & disc information area, and can therefore access the DMA more rapidly based on the read location information. That is, the disc defect management can be more efficiently performed based on the location information.

Also, the drive & disc information (including location information regarding the test area and the write protect information) is recorded in the temporary defect management information. Therefore, even if a disc drive does not access the drive & disc information area, the location information regarding the test area and the write protect information can be obtained from the temporary defect management area. Inclusion of the test location information into the temporary defect management information enables quick finding of a pointer to the test location information.

In the shown embodiment, since disc defect management is performed using the linear replacement method, the temporary defect information includes information indicating a position of an area of the disc 100 having a defect and information indicating a position of an area of the disc 100 that is replacement for the area having the defect. More preferably, the temporary defect information further includes information indicating whether the defect occurs in a single defect blocks or continuous defect blocks. The temporary defect management information is used to manage the temporary defect information and includes information indicating the position of the disc 100 where the temporary defect information is recorded. More preferably, the temporary defect management information further includes the location information regarding the test area and the write protect information. Detailed data structures of the temporary defect information and the temporary defect management information will be explained below.

In the shown embodiment, the temporary defect information and temporary defect management information are recorded every time when a recording operation ends. In the TDMA, therefore, information regarding a defect, which occurs in data recorded during recording operation #0, and information regarding a replacement area are recorded as temporary defect information #0. Information regarding a defect, which occurs in data recorded during recording operation #1, and information regarding a replacement area are recorded as temporary defect information #1. Further, information for managing temporary defect information #0, #1, . . . is recorded as temporary defect management information #0, #1, . . . in the TDMA. When additional data cannot be recorded in the data area or when a user does not wish to record additional data therein (i.e., the data needs to be finalized), the temporary defect information recorded in the temporary defect information area and the temporary defect management information recorded in the temporary defect management information area are rewritten to the DMA.

In the shown embodiment, all defect information contained in previously recorded temporary defect information #0, #1, #2, . . . , #i-1 is further contained in temporary defect information #i. Thus, it is easy to finalize the disc 100 just by reading defect information contained in a last recorded temporary defect information #i and rewriting the read temporary defect information #1 to the DMA. However, it is understood that the temporary defect information #i need not include all prior defect information in all aspects of the invention.

In the case of a high-density disc 100 with a recording capacity of several dozens of GBs such as a Blu-Ray disc or an Advance Optical Disc (AOD), it is desirable that a cluster is allocated to an area in which the temporary defect management information #i is recorded and four to eight clusters are allocated to an area in which temporary defect information #i is recorded. This is because it is preferable to record new information in units of clusters to update information when a minimum physical unit of record is a cluster, although the amount of temporary defect information #i is just several KBs. While not required in all aspects, a total amount of defects allowed in a disc is preferably about 5% of the disc recording capacity. For instance, about four to eight clusters are required to record temporary defect information #i, considering that information regarding a defect is about 8 bytes long and the size of a cluster is 64 KBs. However, it is understand that additional percentages of disc recording capacity can be used according to need, and that the new information need not be recorded in clusters in all aspects of the invention.

The verify-after-write method can also be performed on the temporary defect information #i and the temporary defect management information #i. When a defect is detected, information recorded in an area of the disc 100 having a defect may be either recorded in a spare area using the linear replacement method, or recorded in an area adjacent to the TDMA using the slipping replacement method.

In the shown embodiment, the drive & disc information area and the TDMA are separate areas. However, it is understood that the areas may be formed as a single area. In the latter case, a part of the drive & disc information (e.g., the location information regarding the test area and the write protect information), which needs to be updated is updated and recorded together with the temporary defect management information.

Figure 3B:
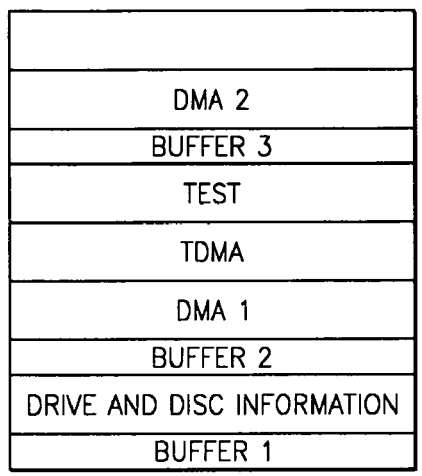
FIG. 3B illustrates a data structure of a disc with a drive & disc information area, a temporary defect management area (TDMA), and defect management areas (DMAs) as shown in FIG. 3A.

FIG. 3B illustrates a data structure of the disc 100 with a drive & disc information area, a TDMA, and DMAs as shown in FIG. 3A. Referring to FIG. 3B, two DMAs, DMA 1 and DMA 2, are formed to increase the robustness of defect management information, the defect information, and the write protect information. FIG. 3B also shows a temporary defect management area TDMA, a test area Test in which recording conditions of data are measured, and a drive and disc area Drive and Disc information in which the drive & disc information is recorded and which is located beside a buffer area Buffer 2 beside the DMA DMA1. Buffer 1, Buffer 2, and Buffer 3 are areas acting as buffers that indicate borders of the respective areas. A disc 100 according to embodiments of the present invention may include a plurality of the drive & disc information areas.

Figure 4A:
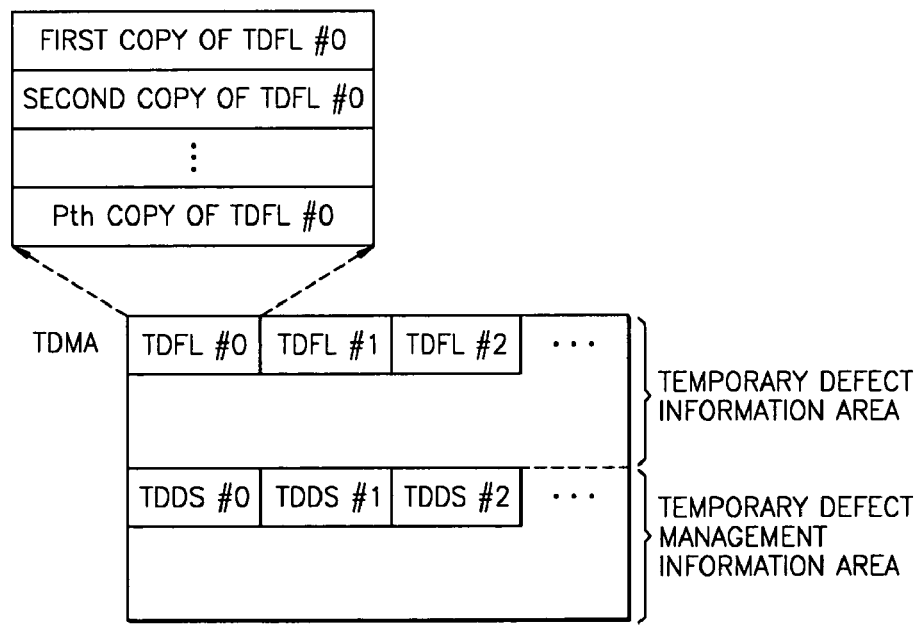
FIGS. 4A through 4D illustrate data structures of a TDMA where disc defect management has been performed, according to embodiments of the present invention.

FIGS. 4A through 4D illustrate data structures of a TDMA where disc defect management has been performed, according to embodiments of the present invention. Referring to FIG. 4A, the TDMA is logically divided into a temporary defect information area and a temporary defect management information area. In the temporary defect information area, temporary defect information TDFL #0, TDFL #1, TDFL #2, . . . are sequentially recorded starting from a start of the area toward the end, such that the physical or logical addresses of the temporary defect information increase. The temporary defect information TDFL #0, TDFL #1, TDFL #2, . . . are repeatedly recorded several times to increase the robustness of information. In particular, FIG. 4A illustrates recording the temporary defect information TDFL #0 P times. In the temporary defect management information area, the temporary defect management information TDDS #0, TDDS #1, TDDS #2, . . . are sequentially recorded starting from the start of the area. The temporary defect management information TDDS #0, TDDS #1, and TDDS #2 correspond to the temporary defect information TDFL #0, TDFL #1, and TDFL #2, respectively.

Figure 4B:
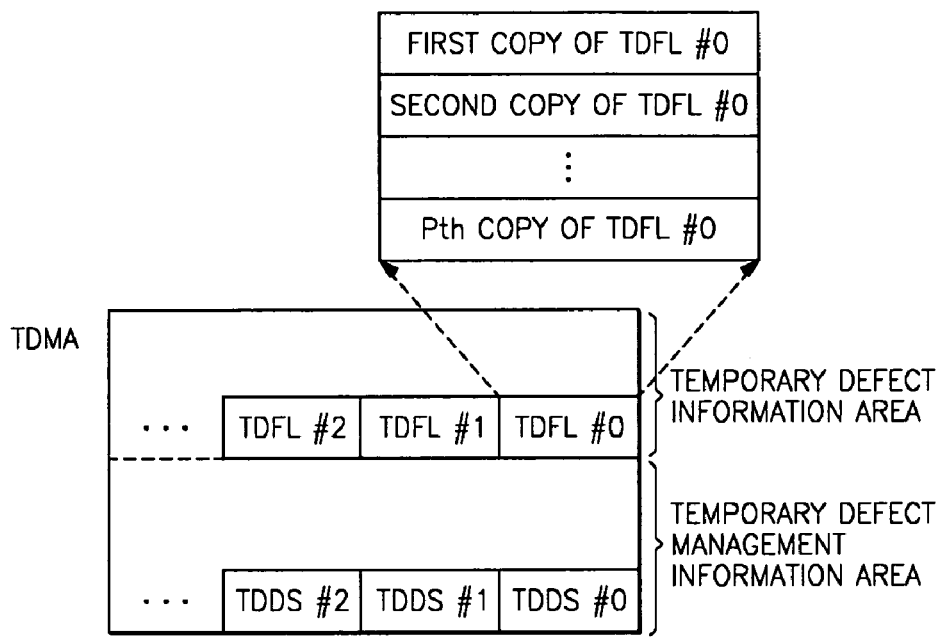

Referring to FIG. 4B, compared to FIG. 4A, the TDMA is also logically divided into a temporary defect information area and a temporary defect management information area. However, the sequences of recording information are not the same. More specifically, in the temporary defect information area, the temporary defect information TDFL #0, TDFL #1, TDFL #2, . . . are sequentially recorded starting from the end of the area toward the start such that the physical or logical addresses of the temporary defect information decrease. Similarly, the temporary defect information TDFL #0, TDFL #1, TDFL #2, . . . is repeatedly recorded several times to increase the robustness of information. In particular, FIG. 4B illustrates recording the temporary defect information TDFL #0 P times. In the temporary defect management information area, temporary defect management information TDDS #0, TDDS #1, TDDS #2, . . . are sequentially recorded starting from the end of the area. The temporary defect management information TDDS #0, TDDS #1, and TDDS #2 correspond to the defect information TDFL #0, TDFL #1, and TDFL #2, respectively.

Figure 4C:
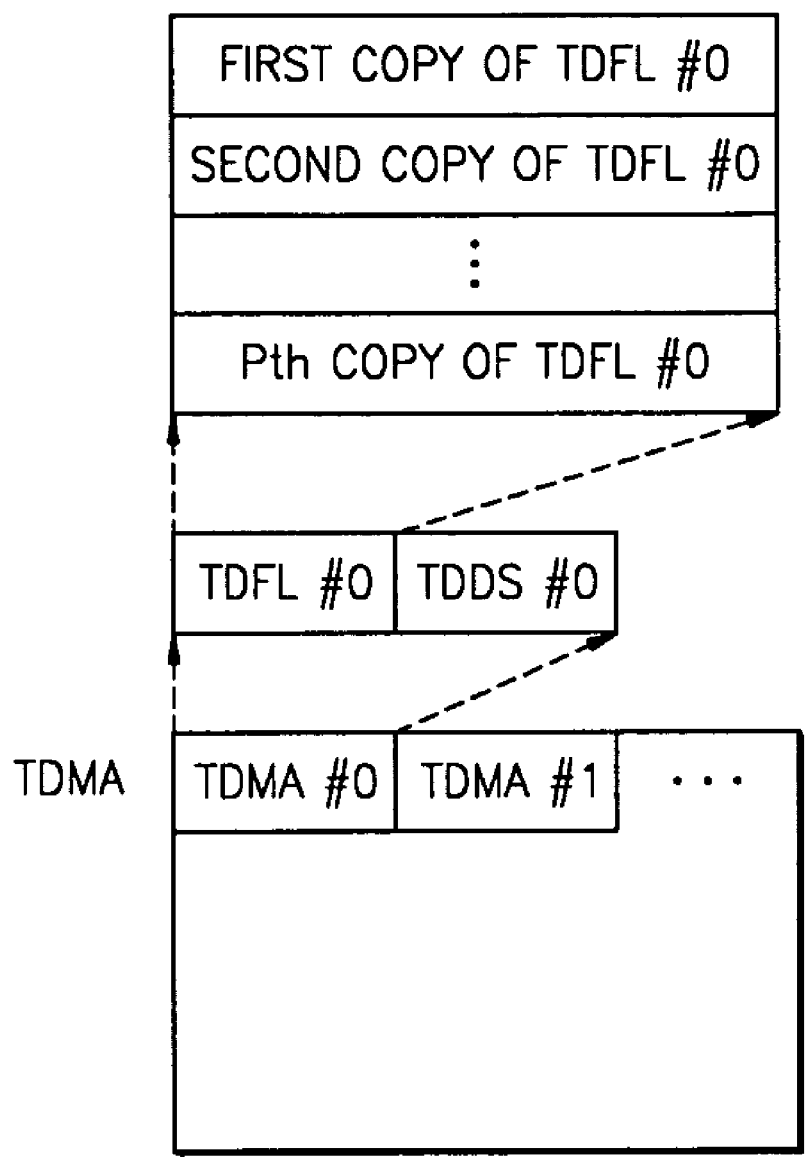

Referring to FIG. 4C, corresponding temporary defect information and temporary defect management information are recorded as pairs of information in the TDMA. More specifically, the temporary management information TDMA #0, TDMA #1, . . . are sequentially recorded starting from the start of the TDMA such that the physical or logical addresses of the temporary management information increase. The temporary management information TDMA #0 contains a pair of corresponding temporary defect management TDDS #0 and temporary defect information TDFL #0, and temporary management information TDMA #1 contains a pair of corresponding temporary defect management information TDDS #1 and temporary defect information TDFL #1. The temporary defect information TDFL #0, TDFL #1, TDFL #2, . . . are repeatedly recorded several times to increase the robustness of information. In particular, FIG. 4C illustrates recording the temporary defect information TDFL #0 P times.

Figure 4D:
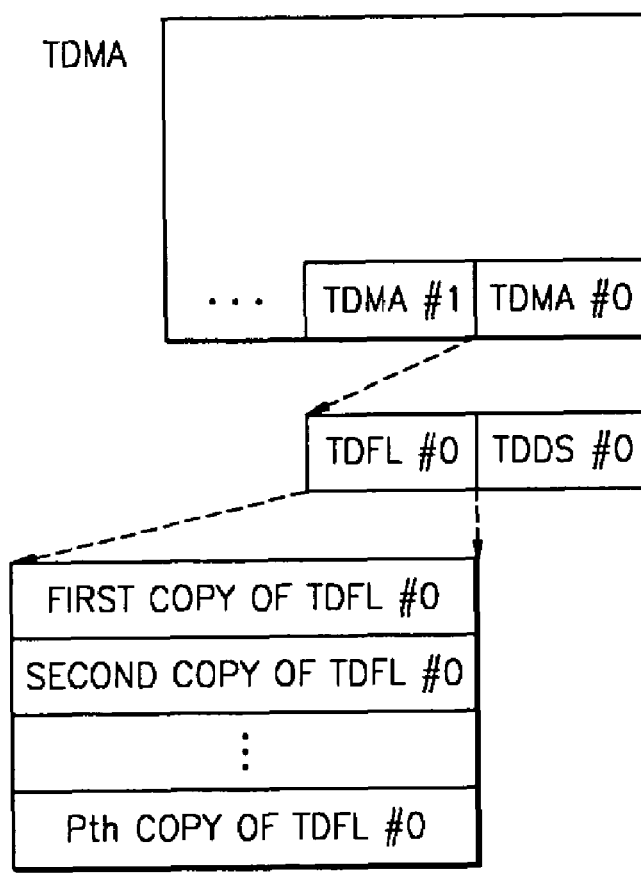

Referring to FIG. 4D, compared to the TDMA of FIG. 4C, corresponding temporary defect information and temporary defect management information are recorded as pairs of information in a TDMA. However, the sequence of recording the information is not the same. More specifically, in the TDMA, the temporary management information TDMA #0, TDMA #1, . . . are sequentially recorded starting from the end of the TDMA such that the physical or logical addresses of the temporary management information decrease. The temporary management information TDMA #0 contains a pair of corresponding temporary defect management information TDDS #0 and temporary defect information TDFL #0, and the temporary management information TDMA #1 contains a pair of corresponding temporary defect management information TDDS #1 and temporary defect information TDFL #1. Similarly, the temporary defect information TDFL #0, TDFL #1, TDFL #2, . . . are repeatedly recorded several times to increase the robustness of information. In particular, FIG. 4D illustrates recording of the temporary defect information TDFL #0 P times.

Figure 5A:
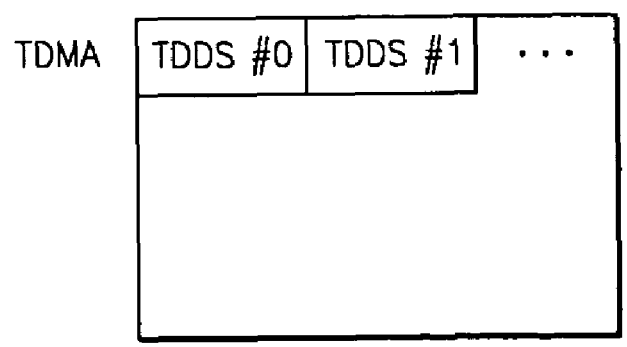
FIGS. 5A and 5B illustrate data structures of a TDMA where disc defect management is not performed, according to embodiments of the present invention.
Figure 5B:
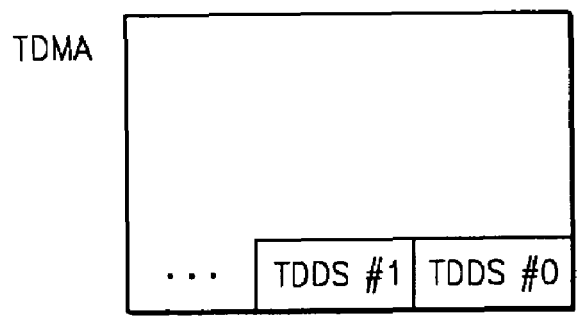

FIGS. 5A and 5B illustrate data structures of a TDMA where disc defect management is not performed, according to embodiments of the present invention. Referring to FIG. 5A, when a user decides not to perform disc defect management, the temporary defect management information is recorded in the TDMA in recording operation units. More specifically, the temporary defect management information TDDS #0, TDDS #1, . . . are recorded starting from the start of the TDMA such that the physical or logical addresses of the temporary defect management information increase.

Referring to FIG. 5B, when the user decides not to perform disc defect management, the temporary defect management information is recorded in the TDMA in recording operation units. However, unlike in the FIG. 5A, the temporary defect management information starting from the TDDS #0, TDDS #1, . . . are recorded starting from the end of the TDMA such that the physical or logical addresses of the temporary defect management information decrease.

Figure 6A:
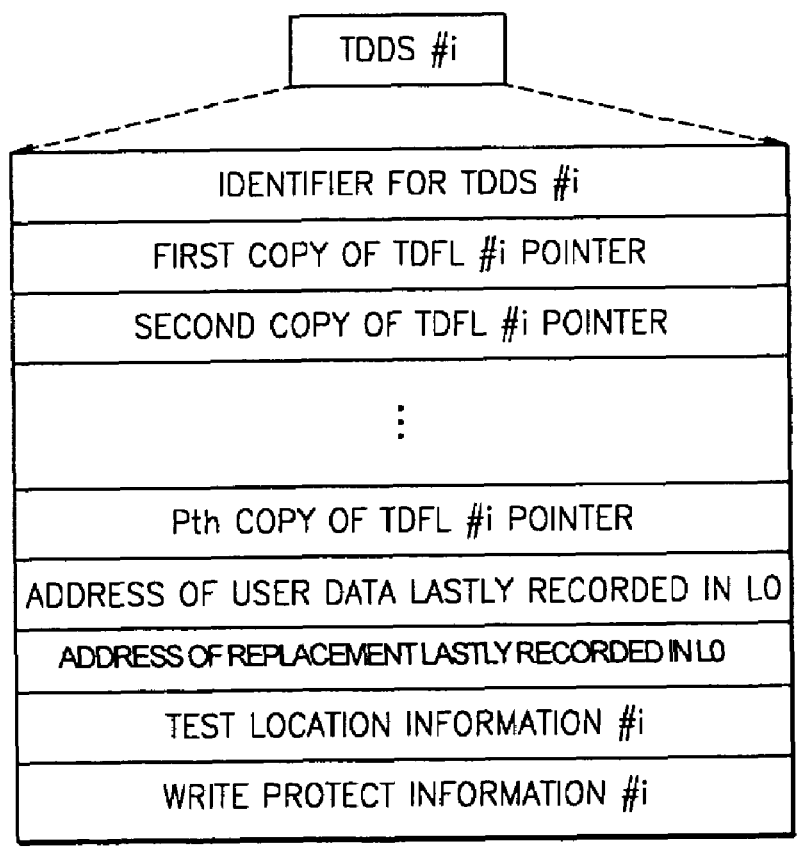
FIGS. 6A and 6B illustrate data structures of temporary defect management information TDDS #i according to embodiments of the present invention.
Figure 6B:
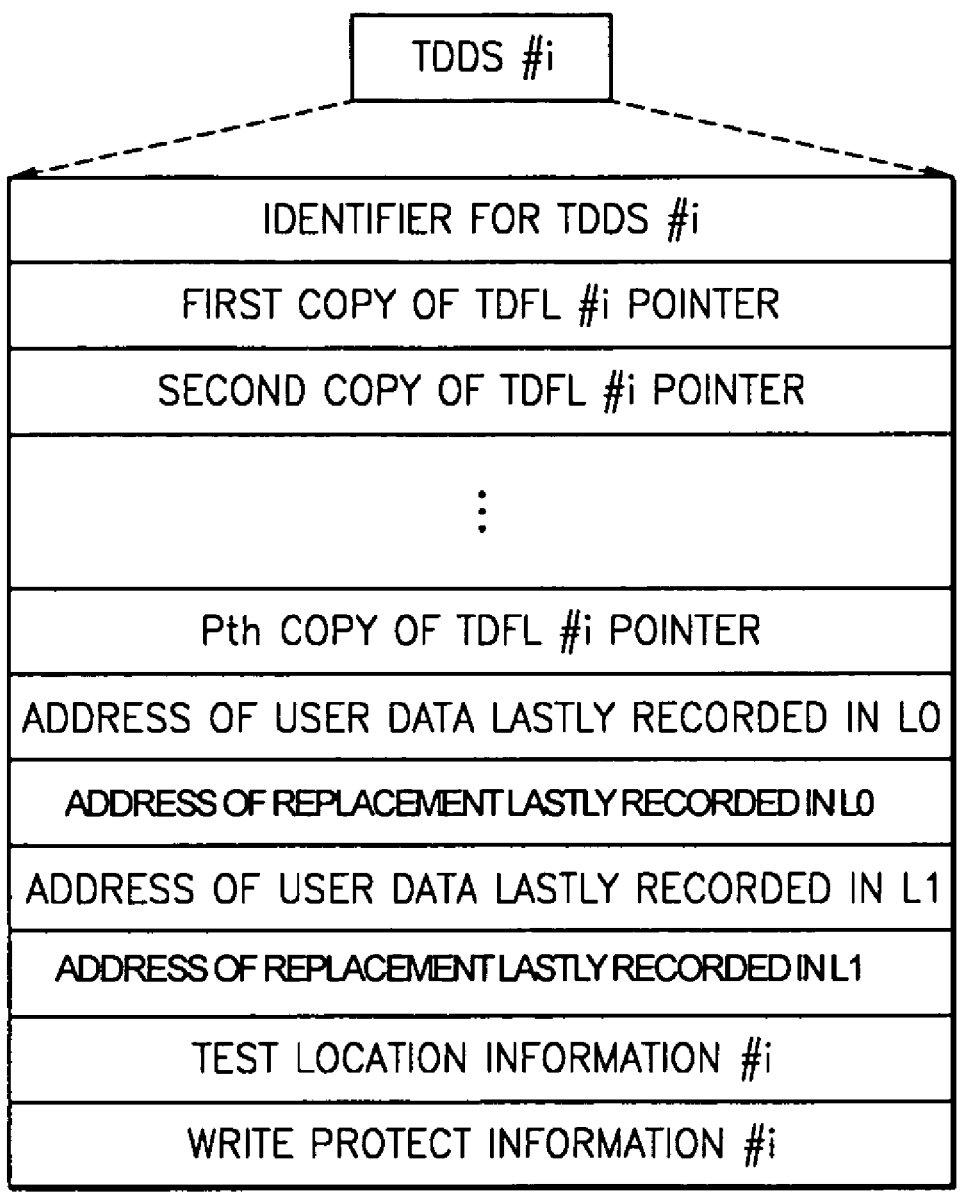

FIGS. 6A and 6B illustrate data structures of temporary defect management information TDDS #i. In detail, FIG. 6A illustrates a data structure of temporary defect management information TDDS #i recorded on a single record layer disc 100 such as that shown in FIGS. 2A and 2B. The temporary defect management information TDDS #i contains an identifier for temporary defect management information TDDS #i, and information regarding the position of corresponding temporary defect information TDFL #i. As previously explained with reference to FIGS. 4A through 4D, temporary defect information TDFL #i according to an aspect of the present invention is repeatedly recorded several times. Thus, the information regarding the position of temporary defect information TDFL #i includes pointers corresponding to temporary defect information TDFL #i, and each pointer is to the recording position of each temporary defect information TDFL #i. Temporary defect management information TDDS #i shown in FIG. 5A includes P pointers to temporary defect information TDFL #i recorded P times.

Also, the temporary defect management information TDDS #i recorded on the single record layer disc 100 describes the address of user data, which is last recorded in a user data area of a record layer L0, and the address of the replacement area which is last recorded in a spare area of the record layer L0. Accordingly, a user can easily utilize the disc 100 just by referring to the last recorded user data area and replacement area.

The temporary defect management information TDDS #i further includes test location information #i and write protect information #i. Accordingly, even if a disc drive does not access the drive & disc information area or the disc defect management is not performed, it is possible to directly access a testable area without detecting the testable area while scanning the test area where recording conditions are tested. Also, it is possible to avoid recording in an undesired area.

A reason for including the test location information into the temporary defect management information will now be described in a greater detail. As described above, the temporary management information contains the temporary defect management information and the temporary defect information, and further contains recording management information that is not shown in the drawings. According to an aspect, the recording management information is a space bit map (SBM). The SBM indicates whether data is recorded in an area of a recording medium on a recording block basis using bit values. The temporary management information is recorded in the temporary defect management information area (TDMA).

For effective use of the TDMA, when updating of a portion of the temporary management information is required, only the portion is updated in the TDMA. When the temporary defect information needs to be updated but the SBM does not need to be updated, only the temporary defect information is updated in a next available area of the TDMA. In this case, the recording location of last recorded temporary defect information changes Thus, the temporary defect management information needs to be updated. Similarly, when updating of the SBM is required but that of the temporary defect information is not required, only the SBM is updated in a next available area of the TDMA. In this case, the updating of the temporary defect management information is also required, since a recording location of a last recorded SBM changes.

As described above, the temporary defect management information must also be updated when updating only a portion of temporary management information recorded in the TDMA since the temporary defect management information must specify location information regarding the updated portion. In other words, when disc 100 is loaded into a drive system, it is difficult for the drive system to detect last recorded temporary management information. To solve this problem, location information regarding respective information contained in the temporary management information are included in the temporary defect management information and the temporary defect management information is recorded at an end of the TDMA. Accordingly, the drive system can easily detect the last recorded temporary management information by reading the location information regarding the last recorded temporary management information from the temporary defect management information. In this regard, the temporary defect management information is recorded sequentially in the TDMA.

The drive system is capable of distinguishing between an area containing data and an area containing no data in the temporary defect management information, and detecting a last recorded data block. It is possible to determine whether an area of a disc contains data by reading a radio frequency (RF) signal from the disc 100. Therefore, when the test location information is included into the temporary management information, it is best to record the test location information in the temporary defect management information.

The test location information is recorded in the temporary defect management information because, when the disc 100 is loaded into the drive system, the drive system reads temporary management information last recorded on the disc 100 by accessing a data block last recorded in the TDMA, detecting the temporary defect management information from the data block, and detecting the last recorded temporary management information from the temporary defect management information. The drive system performs a write/read operation based on the last recorded temporary defect management information. For this reason, the test location information is contained in last recorded temporary defect management information TDDS #i that the disc drive must first detect in order to record data on or read data from the disc 100, thereby allowing easy detection of both the location information regarding temporary defect information TDFL#i and the test location information at once.

Inclusion of the test location information in the temporary defect management information TDDS#i allows the test location information to be easily detected from the TDMA based on an address of the last recorded temporary defect management information TDDS #i, regardless of whether another temporary management information is updated. If the test location information is recorded in an area other than the last recorded temporary defect management information TDDS #i, the last recorded temporary defect management information TDDS #i must further include a pointer to this area for detection of the test location information. In this case, for the detection of the test location information, the last recorded temporary defect management information TDDS #i is detected to obtain the pointer to the area containing the test location information, and the area containing the test location information is detected using the pointer, thereby causing overhead.

FIG. 6B illustrates a data structure of temporary defect management information TDDS #i recorded on a double record layer disc 100 such as that shown in FIGS. 2C and 2D. Temporary defect management information TDDS #i contains an identifier for the temporary defect management information TDDS #i, and information regarding the recording position of corresponding temporary defect information TDFL #i. As previously mentioned with reference to FIGS. 4A through 4D, the temporary defect information TDFL #i according to an embodiment of the present invention is repeatedly recorded several times. Thus, the information regarding the recording position of the temporary defect information TDFL #i contains pointers to the recording positions of respective temporary defect information TDFL #i. In particular, the temporary defect management information TDDS #i shown in FIG. 5B includes P pointers, each pointer to each of temporary defect information TDFL #i that is repeatedly recorded P times.

Also, the temporary defect management information TDDS #i recorded on a double record layer disc 100 describes the address of user data that is last recorded in a user data area of a first record layer L0, the address of replacement that is last recorded in a spare area of the first record layer L0, the address of user data that is last recorded in a user data area of a second record layer L1, and the address of replacement that is last recorded in a spare area of the second record layer L1. Accordingly, a user can easily utilize the disc 100 just by referring to the last recorded user data and replacement.

Similarly to the single record layer disc 100, the temporary defect management information TDDS #i further includes test location information #i and write protect information #i. Accordingly, even if a disc drive does not access the drive & disc information area or the disc defect management is not performed, it is possible to directly access a testable area without detecting the testable area while scanning the test area where recording conditions are measured. Also, it is possible to avoid recording in an undesired area.

Figure 7:
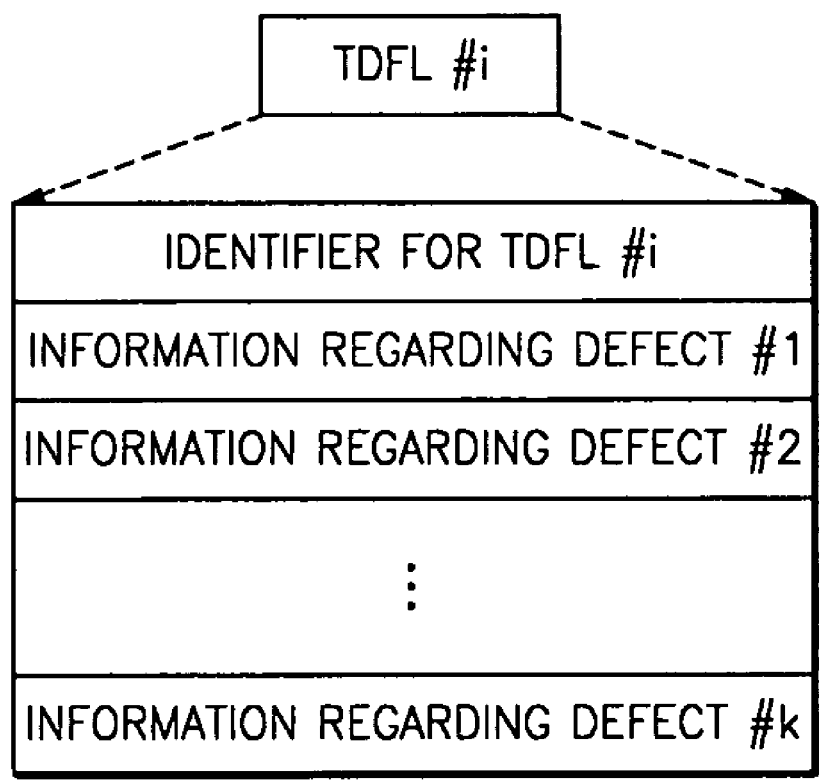
FIG. 7 illustrates a data structure of a temporary defect information TDFL #i according to an embodiment of the present invention.

FIG. 7 illustrates a data structure of temporary defect information TDFL #i. Referring to FIG. 7, temporary defect information TDFL #i contains an identifier for temporary detect information TDFL #i, and information regarding defects #1, #2, ..., #k. The information regarding defects #1, #2, ..., #k is state information indicating the positions of defects and replacements, and whether a defective area includes a single defect block or continuous defect blocks.

Figure 8A:
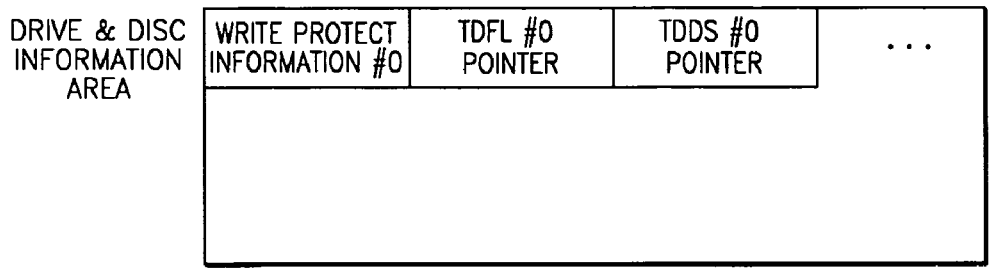
FIGS. 8A and 8B illustrate data structures of a drive & disc information area according to embodiments of the present invention.
Figure 8B:
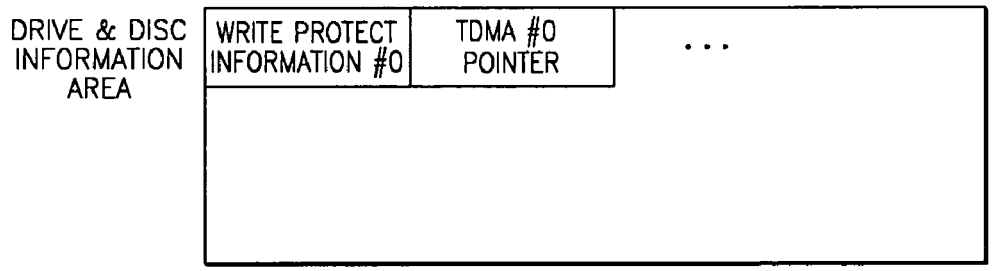

FIGS. 8A and 8B illustrate data structures of a drive & disc information area according to embodiments of the present invention. Referring to FIG. 8A, write protect information #i, a pointer to the location of temporary defect information TDFL #i, and a pointer to the location of temporary defect management information TDDS #i are recorded in recording operation units in the drive & disc information area, when the temporary defect information TDFL #i and the temporary defect management information TDDS #i are separately recorded in a TDMA as shown in FIG. 4A or 4B. Referring to FIG. 8B, write protect information #i and a pointer to the location of temporary management information area TDMA #i are recorded in recording operation units in the drive & disc information area, when the temporary defect information TDFL #i and temporary defect management information TDDS #i are recorded to be included in the temporary management information area TDMA #i in the TDMA as shown in FIG. 4C or 4D.

According to an embodiment of the present invention, the write protect information (which is recorded in the drive & disc information area and the temporary defect management information TDDS #i) does not allow additional data to be recorded on the disc 100. The write protect information may include flag information that indicates whether write protection is enabled or disabled on the entire disc 100, and information that indicates recordable areas even if write protection is enabled. For instance, a first bit of the write protect information is set as the flag information that indicates whether write protection is enabled or disabled, and each of the other bits is set to indicate whether at least one predetermined area is recordable or not. If the write protection is enabled, a second bit of the write protect information may indicate whether the drive & disc information area is recordable or not. Otherwise, the second bit may indicate whether the drive & disc information area is recordable or not, and a third bit may indicate whether a DMA is recordable or not. The third and fourth bits may indicate whether the DMA and a spare area are recordable or not.

When the write protect information is recorded, the following areas can be recordable according to aspects of the invention.

In one area, data recording is allowed in the drive & disc information area, even if the write protect information is recorded on the disc 100 and additional data cannot be further recorded. In other words, the drive & disc information area is not affected by the write protect information recorded to enable write protection. Accordingly, it is possible to change the write protect information.

In another area, even if the write protect information is recorded to enable write protection, a part of the drive & disc information area allocated for the write protect information is not affected by the write protection. In other words, data recording is allowed in the part of the drive & disc information area Thus, the write protect information can be changed.

In a further area, even if the write protect information is recorded to enable write protection, a temporary defect management area (TDMA), the drive & disc information area, and a spare area are not affected by the write protection (i.e., data recording is allowed in these areas). Thus, the write protect information can be changed. Further, disc defect management can be performed even after recording of the write protect information.

If a rate of error correction in a data block of a user data area is lower than a predetermined reference value when reproducing data stored in the user data area, disc defect management can be performed such that the data block is regarded as an area where the probability of error occurrence is higher, data stored in the data block is rewritten to the spare area before reproduction of the data, and the data block is determined to be a defective area.

If the disc 100 includes more than one spare area, at least one area of the spare areas is determined to be a recordable area according to an aspect of the invention.

Areas in which data recording is allowed even if the write protect information is recorded, are not limited to the above description. That is, the number and type of the areas can be adjusted if necessary.

Figure 9:
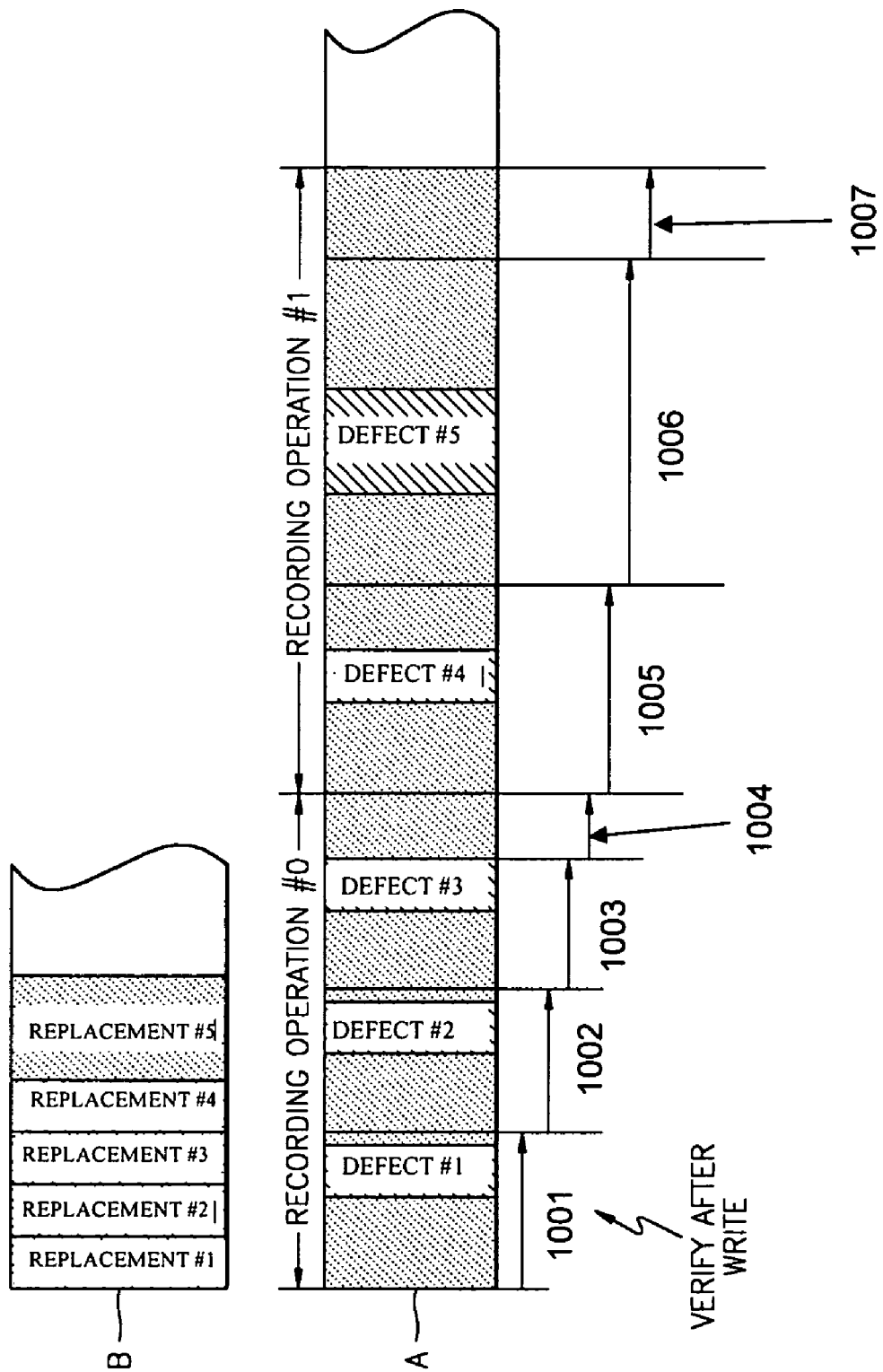
FIG. 9 illustrates diagrams for explaining recording of data in a user data area A and a spare area B according to an embodiment of the present invention.

FIG. 9 is a reference diagram illustrating in detail recording of data in a user data area A and a spare area B, according to an embodiment of the present invention. Data can be processed in units of sectors or clusters. A sector denotes a minimum unit of data that can be managed in a file system of a computer or in an application. A cluster denotes a minimum unit of data that can be physically recorded on a disc at once. In general, one or more sectors constitute a cluster.

There are two types of sectors: a physical sector and a logical sector. The physical sector is an area on a disc where a sector of data is to be recorded. An address for detecting the physical sector is called a physical sector number (PSN). The logical sector is a unit in which data can be managed in a file system or an application. An address for detecting the logical sector is called a logical sector number (LSN). A disc recording/reading apparatus detects the recording position of data on a disc using the PSN. In a computer or a data application, the entire data is managed in units of the LSNs and the position of data is detected using an LSN. The relationship between the LSN and the PSN is changed by a controller of the recording/reading apparatus, based on whether the disc contains a defect and an initial position of recording data.

Referring to FIG. 9, A denotes a user data area and B denotes a spare area in which PSNs are sequentially allocated to a plurality of sectors (not shown). In general, each LSN corresponds to at least one PSN. However, since LSNs are allocated to non-defective areas, including replacements recorded in the spare area, the correspondence between the PSNs and the LSNs is not maintained when the disc 100 has a defective area. This is true even if the size of the physical sector is the same as that of the logical sector.

In the user data area A, user data is recorded either in a continuous recording mode or a random recording mode. In the continuous recording mode, the user data is recorded sequentially and continuously. In the random recording mode, user data is randomly recorded. In the data area A, sections 1001 through 1007 denote predetermined units of data in which the verify-after-write method is performed. A recording and/or reproducing apparatus records user data in section 1001, returns to the start of section 1001, and checks if the user data is appropriately recorded or a defect exists in section 1001. If a defect is detected in a portion of section 1001, the portion is designated as defect #1. The user data recorded in defect #1 is also recorded on a portion of the spare area B. Here, the portion of the spare area B in which data recorded in defect #1 is rewritten is called replacement #1. Next, the recording and/or reproducing apparatus records user data in section 1002, returns to the start of section 1002, and checks whether the data is properly recorded or a defect exists in section 1002. If a defect is detected in a portion of section 1002, the portion is designated as defect #2. Likewise, replacement #2 corresponding to defect #2 is formed in the spare area B. Further, defect #3 and replacement #3 are designated in section 1003 of the user data area A and the spare area B, respectively. In section 1004, a defect does not occur and a defective area is not designated.

The recording and/or reproducing apparatus records information regarding defect #1, #2, and #3 occurring in sections 1001 through 1004 as temporary defect information TDFL #0 in the TDMA, when recording operation #0 is expected to end, after the recording and verifying of data to section 1004 (i.e., when a user presses the eject button of a recording and/or reproducing apparatus or recording of user data allocated in a recording operation is complete). Also, management information for managing temporary defect information TDFL #0 is recorded as temporary defect management information TDDS #0 in the TDMA.

When recording operation #1 starts, data is recorded in sections 1005 through 1007, and defects #4 and #5 and replacements #4 and #5 are formed in the user data area A and the spare area B, respectively, as explained in sections 1001 through 1004. Defects #1, #2, #3, and #4 occur in the single blocks, whereas defect #5 occurs in continuous defect blocks. Replacement #5, which is replacement for defect #5, is recorded in continuous replacement blocks. Here, a block refers to a physical or logical record unit, a range of a unit block being not limited. If the second recording operation is expected to end, the recording and/or reproducing apparatus records information regarding defects #4 and #5 as temporary defect information TDFL #1, and records the information contained in the defect information DFL #1 once again. Thereafter, management information for managing temporary defect information TDFL #1 is recorded as temporary defect management information #1 in the TDMA.

For disc finalization, last recorded temporary defect information and temporary defect management information are recorded as defect information and defect management information in a defect management area (DMA), respectively. Also, information regarding the recording positions of the last recorded temporary defect information and temporary defect management information, and the above write protect information are further recorded in the TDMA.

Figure 10:
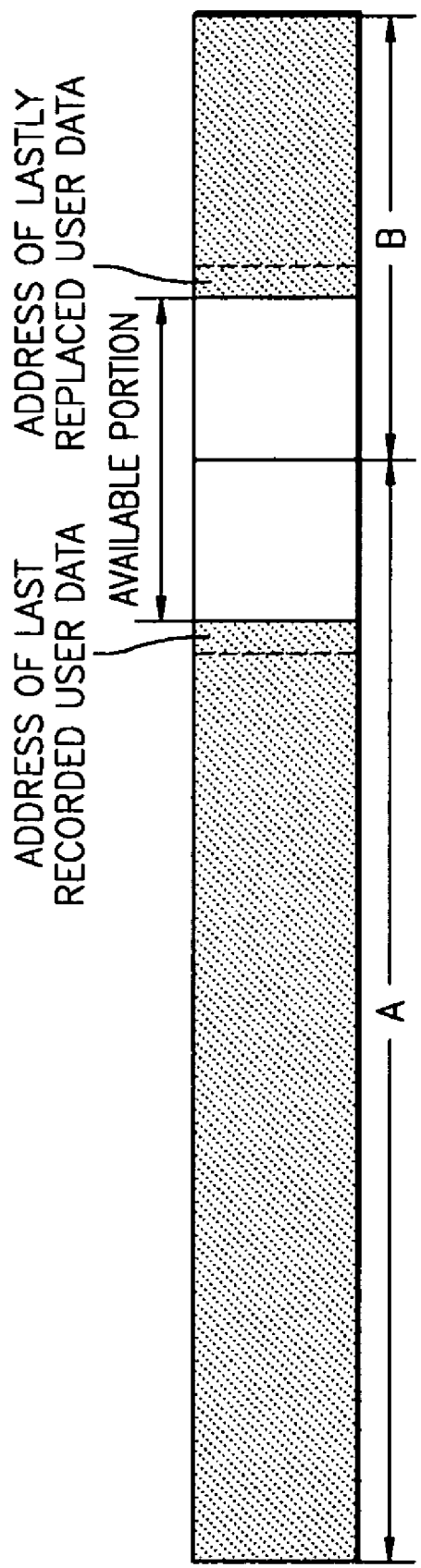
FIG. 10 is a diagram illustrating an effective use of a data area according to an embodiment of the present invention.

FIG. 10 is a diagram illustrating an effective use of a user data area according to an aspect of the present invention. FIG. 10 reveals that an available portion of a user data area can easily be detected with the address of user data that is lastly recorded in the user data area and the address of replacement that is lastly recorded in the spare area. In particular, the available portion can be more easily detected when the user data is recorded from the inner part/outer part of the user data area to its outer part/inner part and data, which is a replacement for a defect, is recorded from the outer part/inner part of the spare area to its inner part/outer part, respectively. In other words, the user data and the data for replacement are preferably recorded in opposite recording directions.

When the physical addresses of the user data are increased from the inner part of the record layer L0 to the outer part and increased from the outer part of the record layer L1 to the inner part, the physical address of the data which is lastly recorded in the user data areas of record layers L0 and L1 has the largest number. Also, the last recorded replacement has the physical address with the smallest number, when physical addresses of replacements are reduced from the outer part to the inner part in a spare area of the record layer L0 and increased from the inner part to the outer part in a spare area of the record layer L1. Accordingly, if the addresses of the last recorded data and replacement areas are included in the temporary defect management information TDDS #i, as shown in FIGS. 6A and 6B it is possible to detect the positions of data and replacement that are to be newly recorded, without completely reading temporary defect information TDFL #i and estimating the positions of the defect and replacement. Further, available portions of the user data area and the spare area are located continuously, thereby enabling effective use of the user area. For this reason, additional data can be recorded or changed even after recording write protect information during disc finalization, and disc defect management can be more effectively performed.

Figure 11A:
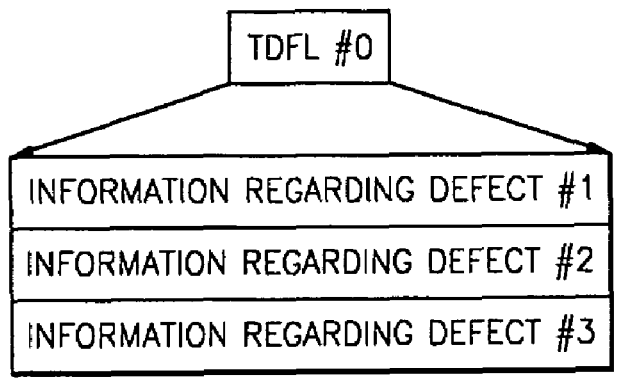
FIGS. 11A and 11B illustrate data structures of temporary defect information TDFL #0 and TDFL #1 according to an embodiment of the present invention.
Figure 11B:
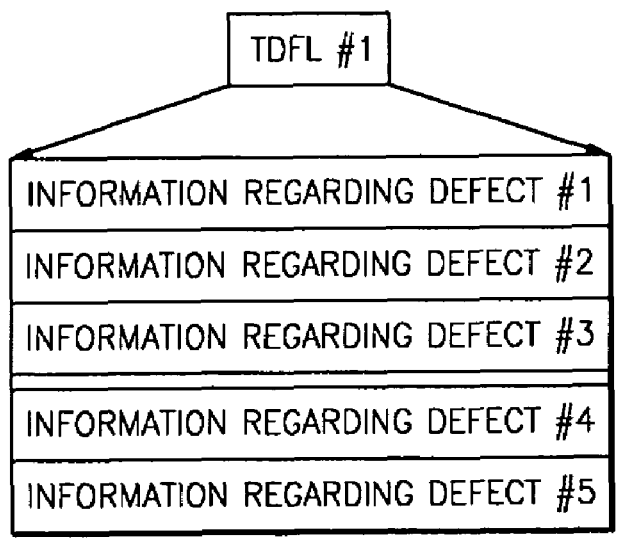

FIGS. 11A and 11B illustrate data structures of temporary defect information TDFL #0 and TDFL #1. Referring to FIGS. 11A and 11B, temporary defect information TDFL #0 contains information regarding defects #1, #2, and #3. The information regarding defect #1 indicates the position of an area in which defect #1 exists and the position of an area in which replacement #1 is recorded. The information regarding defect #1 may further include information indicating whether defect #1 occurs in continuous defect blocks or a single defect block according to aspects of the invention. Likewise, the information regarding defect #2 indicates whether defect #2 occurs in continuous defect blocks or a single defect block, the position of an area in which defect #2 exists, and the position of an area in which replacement #2 is recorded. The information regarding defect #3 indicates whether defect #3 occurs in continuous defect blocks or a single defect block, the position of an area in which defect #3 exists, and the position of an area in which replacement #3 is recorded.

In the shown embodiment, the temporary defect information TDFL #1 further contains information regarding defects #4 and #5 in addition to the information contained in temporary defect information TDFL #0. More specifically, the temporary defect information TDFL #1 includes the information regarding defect #1, the information regarding defect #2, the information regarding defect #3, the information regarding defect #4, and the information regarding defect #5. However, this cumulative recording is not required in all aspects of the invention.

Figure 12:
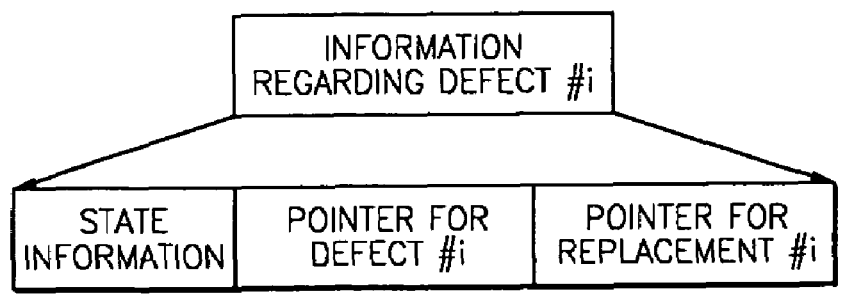
FIG. 12 illustrates a data structure of information regarding defect #i according to an embodiment of the present invention.

FIG. 12 illustrates a data structure of information regarding defect #i. Referring to FIG. 12, information regarding defect #i includes state information indicating whether defect #i occurs in continuous defect blocks or a single defect block, a pointer to defect #i, and a pointer to replacement #i. When the defect #i is determined to occur in the continuous defect blocks, the state information further represents whether pointer to defect #i points to the start or end of the continuous defect blocks and whether pointer for the replacement #i points out the start or end of a replacement block that replaces the defect #i. When the state information indicates the pointer for defect #i as the start of the continuous defect blocks and the pointer for replacement #i as the start of the replacement block, the pointer for defect #i represents a starting physical sector number of the continuous defect blocks and the pointer for replacement #i represent a starting physical sector number of replacement #i. In contrast, when the state information indicates the pointer for defect #i as the end of the continuous defect blocks and the pointer for replacement #i as the end of the replacement block, the pointer for defect #i represents an ending physical sector number of the continuous defect blocks and the pointer for replacement #i represent an ending physical sector number of replacement #i. The definition of continuous defect blocks using state information enables effectively recording of information and saves a space of recording, even if information regarding defects is not recorded in units of blocks.

The pointer for defect #i specifies a starting and/or ending point(s) of the defect #i. The pointer for defect #i may include the starting PSN of defect #1 according to an aspect of the invention. The pointer for replacement #i specifies starting and/or ending points of replacement #i. The pointer for replacement #i may also include the starting PSN of the replacement #i.

Figure 13A:
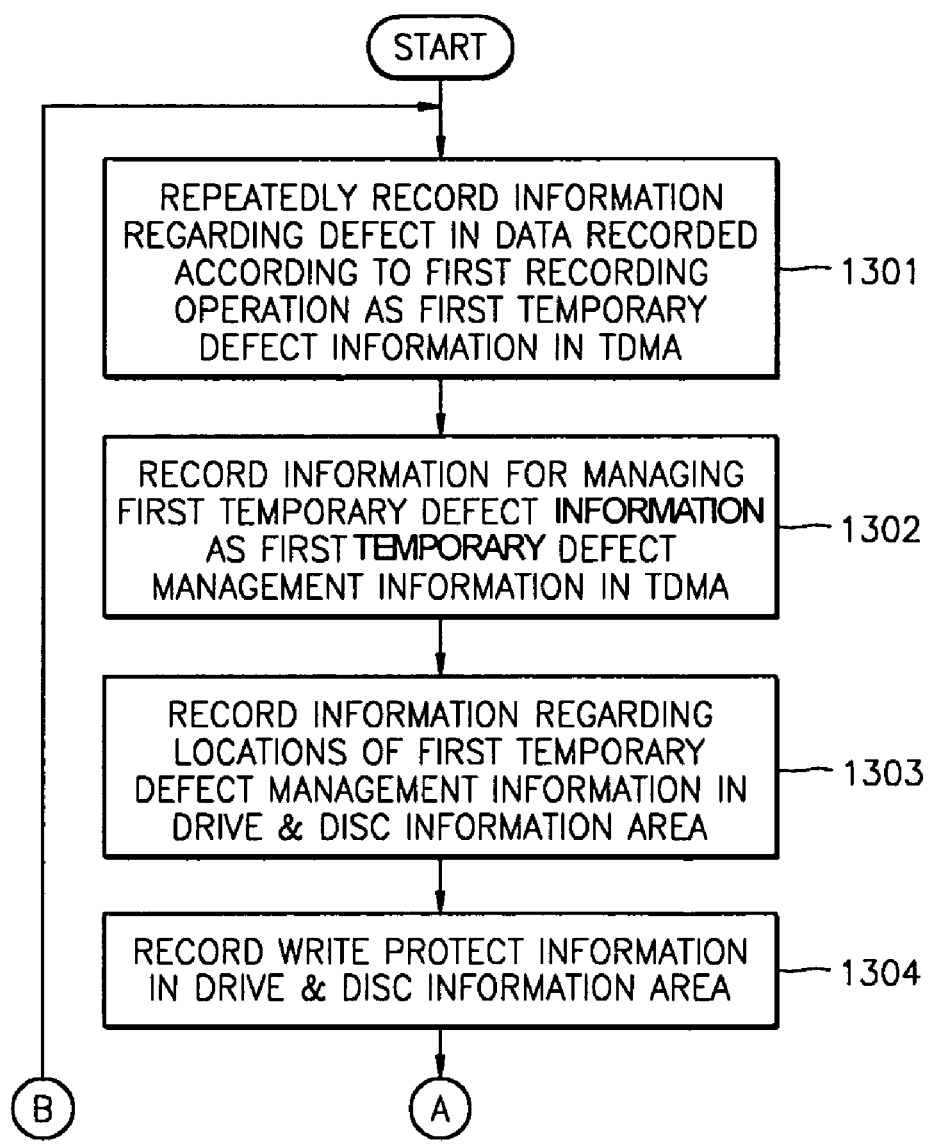
FIGS. 13A and 13B shown a flowchart illustrating a disc defect management method according to an embodiment of the present invention.
Figure 13B:
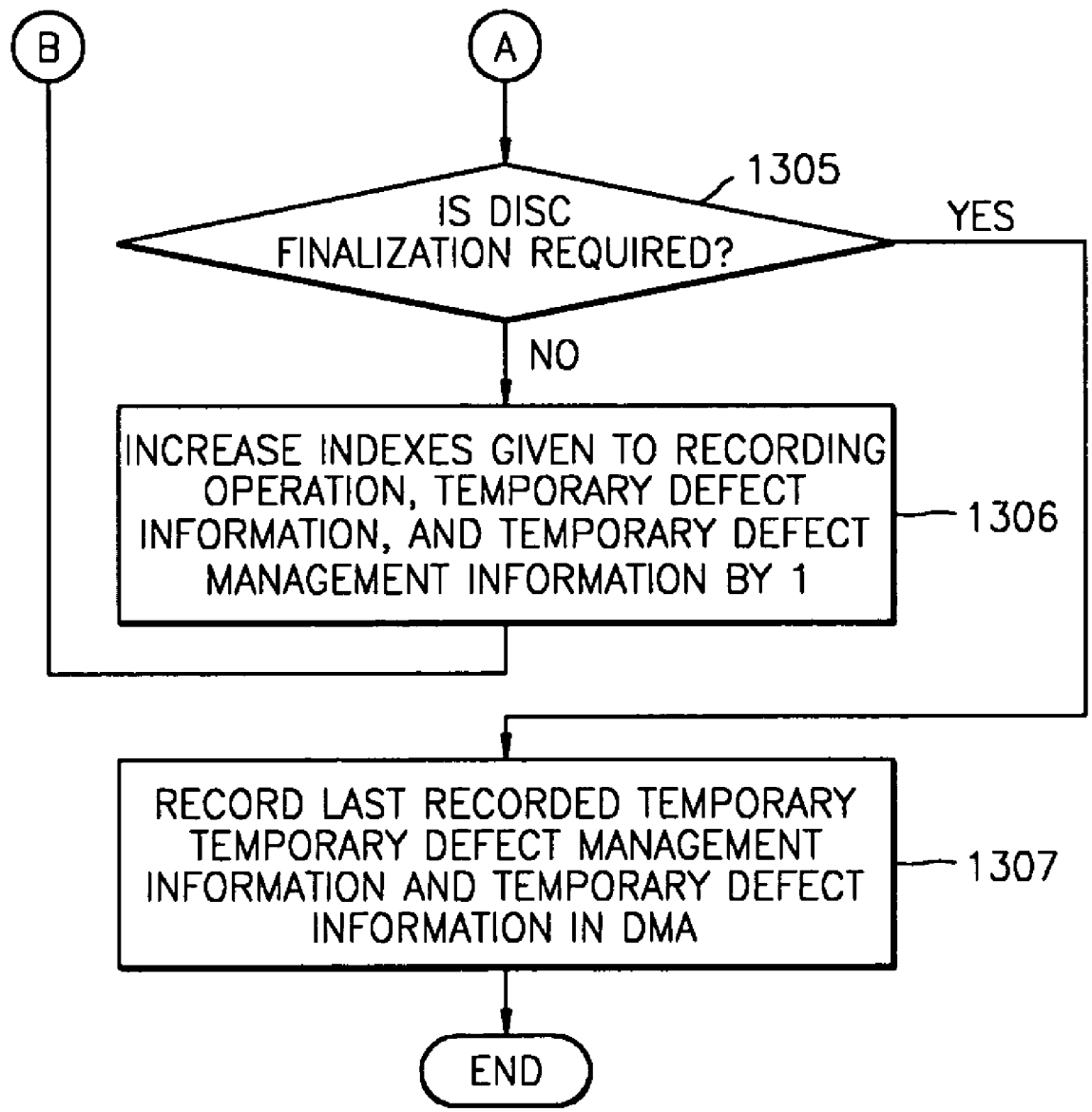

Hereinafter, a disc defect management method according to an embodiment of the present invention will be described with reference to the flowchart shown in FIGS. 13A and 13B Referring to FIGS. 13A and 13B, a recording and/or reproducing apparatus such as that shown in FIG. 1 records defect information regarding data, which is recorded according to a first recording operation, as first temporary defect information in a TDMA of the disc 100 (operation 1301). This process serves to manage the disc defects. The controller 1 of the recording and/or reproducing apparatus controls the recording/reading unit 2 to record management information for managing the first temporary defect information as first temporary defect management information in the TDMA (operation 1302). As described above, the first temporary defect management information includes drive & disc information (i.e., test location information or write protect information) according to an aspect of the invention. Next, information regarding the locations of the first temporary defect information and the first temporary defect management information is recorded in the drive & disc information area (operation 1303). Then, the write protect information is further recorded in the drive & disc information area (operation 1304).

Next, it is checked whether disc finalization is required (operation 1305). If it is determined in operation 1305 that disc finalization is not required, operations 1301 through 1304 are repeated while increasing indexes i given to a recording operation, temporary defect information, and temporary defect management information by 1 (operation 1306). However, if it is determined in operation 1305 that disc finalization is required, the last recorded temporary defect management information and temporary defect information are recorded in the DMA (operation 1307). That is, the last recorded temporary defect management information and temporary defect information are recorded as final defect management information and defect information in the DMA, respectively. The final defect information and defect management information may be repeatedly recorded to increase the reliability of data detection.

Further, while not required in all aspects of the invention, the verify-after-write method may be performed on the final defect management information and defect information. If a defect is detected from the final defect management information, an area of the disc 100 having the defect and the following area containing data may be regarded as being unavailable (i.e., they are designated as a defective area), and the final temporary defect management information and temporary defect information are again recorded after the defective area. Alternatively, the write protect information, which is recorded in the drive & disc information area or included in lastly recorded temporary defect management information TDDS#i, may further be recorded in the DMA according to another aspect of the invention.

Figure 14A:
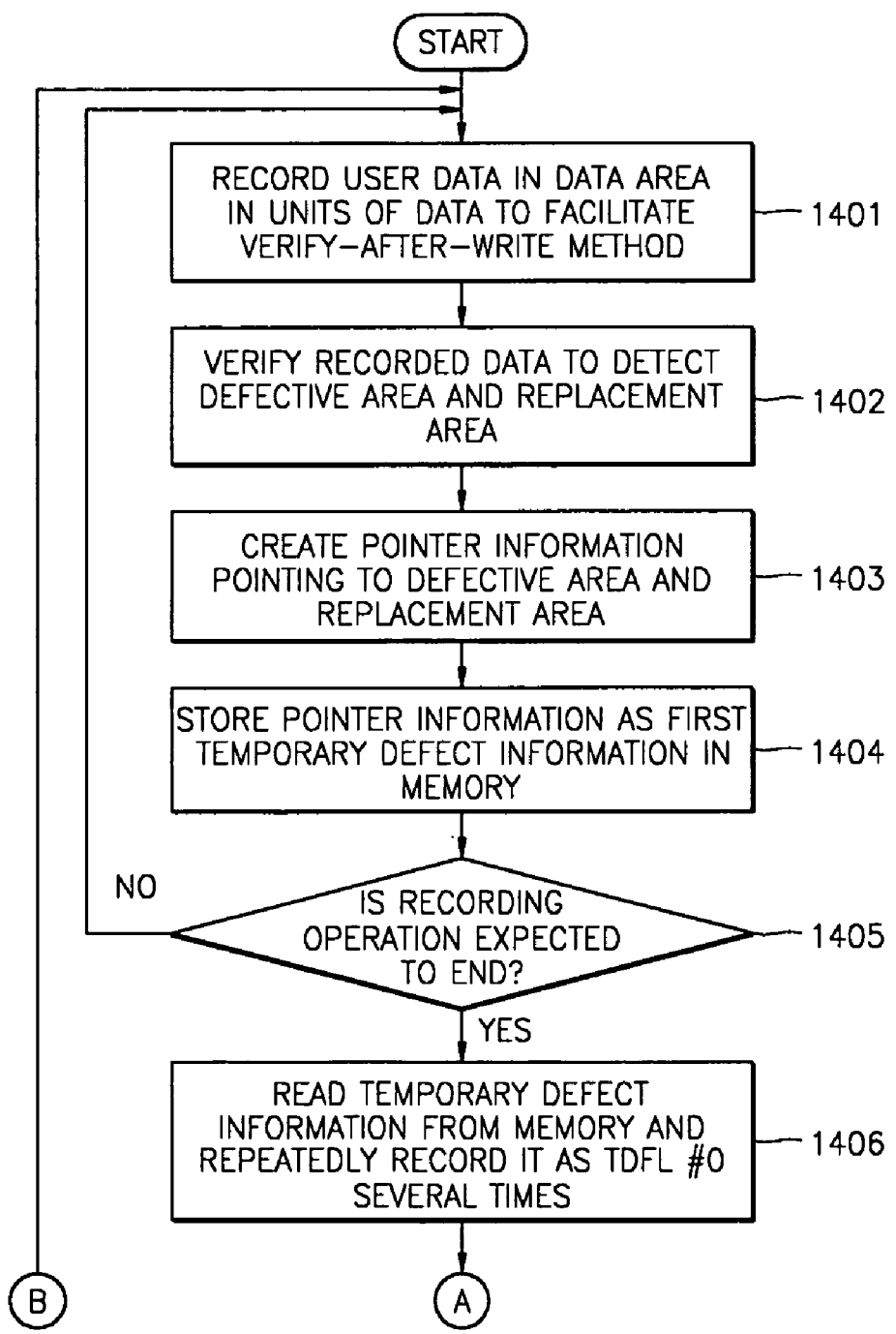
FIGS. 14A and 14B show a flowchart illustrating a disc defect management method according to another embodiment of the present invention.
Figure 14B:
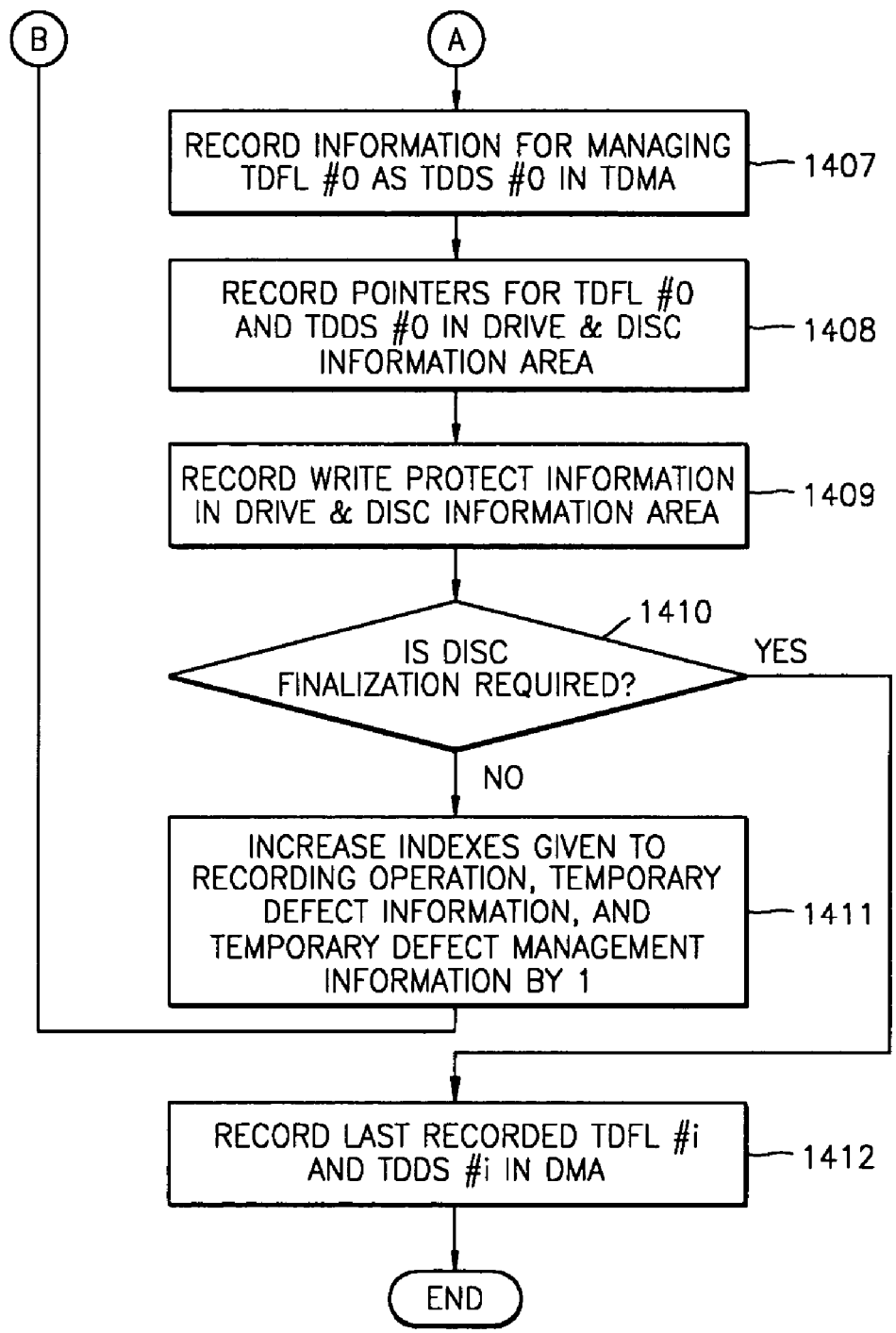

FIGS. 14A and 14B show a flowchart illustrating a disc defect management method according to another embodiment of the present invention. Referring to FIGS. 14A and 14B, a recording and/or reproducing apparatus such as that shown in FIG. 1 records user data in a data area of a disc in units of data to facilitate the verify-after-write method (operation 1401). The data recorded in operation 1201 is verified to detect an area of the disc 100 having a defect (operation 1402). Controller 2 of FIG. 1 designates the area having the defect as a defective area, controls the recording/reading unit 1 to rewrite data recorded in the defective area to a spare area so as to create a replacement area the controller 2 further controls the recording/reading unit 1 to create state information specifying whether the defective area includes a single defect block or continuous defect blocks, and pointer information that points the positions of the defective area and the replacement area (operation 1403). The state information and the pointer information are stored as first temporary defect information in memory (operation 1404). It is checked whether the first recording operation is expected to end (operation 1405).

If it is determined in operation 1405 that the first recording operation is not expected to end, operations 1401 through 1404 are repeated. If it is determined in operation 1405 that the first recording operation is likely to end (i.e., when the recording of the user data is complete by user input or according to the first recording operation), the stored temporary defect information is read and repeatedly recorded as first temporary defect information TDFL #0 in the TDMA several times (operation 1406). Next, management information for managing the first temporary defect information TDFL #0 is recorded as first temporary defect management information TDDS #0 in the TDMA (operation 1407). The first temporary defect management information TDDS #0 further includes test location information and write protect information. Thereafter, a pointer to the location of the first temporary defect information TDFL #0, a pointer to the location of the first temporary defect management information TDDS #0, and the write protect information are recorded in the drive & disc information area of the disc 100 (operations 1408 and 1409).

Alternatively, a pointer for temporary management information TDMA #i, other than the temporary defect information TDFL #i and the temporary defect management information TDDS #i, may be recorded in operation 1408.

Next, it is checked whether the data needs to be finalized (operation 1410). If it is determined in operation 1410 that the finalizing of the disc 100 is not required, operations 1401 through 1409 are repeated. Whenever operations 1401 through 1409 are repeated, indexes i given to each recording operation, temporary defect information TDFL, and temporary defect management information TDDS are increased by 1 (operation 1411). If it is determined in operation 1410 that the finalizing of the disc 100 is needed, a last recorded temporary defect information TDFL #i and a last recorded temporary defect management information TDDS #i are recorded as final defect information DFL and the final defect management information DDS in the DMA (operation 1412). The final defect information DFL and the final defect management information DDS may be recorded several times to increase the reliability of data detection. Similarly, the verify-after-write method may be performed on the final recorded defect information and defect management information. If a defect is detected in this information, an area of the disc 100 having the defect and the following area containing data may be regarded as being unavailable (i.e., the areas are collectively designated as a defective area), and the final temporary defect management information and temporary defect information may be again recorded after the defective area. Alternatively, the write protect information, which is stored in the drive & disc information area or included in lastly recorded temporary defect management information TDDS #i, may further be recorded in the DMA. While described as being increased by 1, it is understood that the index in the methods shown in FIGS. 13A through 14B could instead be based on other numbers.

The aforementioned defect management may be embodied as a computer program that can be run by a computer, which can be a general or special purpose computer. Thus, it is understood that the controller 2 can be such a computer. Codes and code segments, which constitute the computer program, can be easily reasoned by a computer programmer in the art. The program is stored in a computer readable medium readable by the computer. When the program is read and run by a computer, the defect management is performed. Here, the computer-readable medium may be a magnetic recording medium, an optical recording medium, a carrier wave, firmware, or other recordable media.

During reproduction, the recording and/or reproducing apparatus utilizes the defect information and the defect management information in the defect management area and/or the temporary defect management area in order to access the recorded user data. While described in terms of a recording and/or reproducing apparatus as shown in FIG. 1, it is understood that the apparatus can be an individual recording or reproducing apparatus or a recording and reproducing apparatus.

While described in terms of use with write-once disks, it is understood that the present invention can be used with other writeable discs, including re-writeable recording media.

As described above, an aspect of the present invention provides a disc defect management method suitable for use with write once discs. According to an aspect of the present invention, at least one temporary defect information area is present in a lead-in area of a disc and/or a lead-out area, so that information regarding a defect that exists in the disc can be accumulatively recorded. Also, it is easy to finalize the disc by reading only lastly recorded temporary defect information from a temporary defect information area and recording the read information in a defect management area, thereby enabling effective use of the DMA. Accordingly, user data can be recorded on discs (even on write once discs) while performing disc defect management, thereby allowing backup operations to be performed without interruptions. Further, it is possible to change write protect information or perform disc defect management even after recording the write protect information in a disc. Also, even if a disc drive does not access a drive & disc information area and test location information or write protect information is not obtained, the temporary defect management information further includes the test location information and the write protect information. Accordingly, it is possible to directly access a test area and prevent data from being recorded in an improper area. In addition, it is possible to increase the reliability of a system by recording the test location information and the write protect information as temporary defect management information even if a user does not desire to perform disc defect management.

While this invention has been particularly shown and described with reference to embodiments thereof, it will be understood by those skilled in the art that various changes in form and details may be made therein without departing from the spirit and scope of the invention as defined by the accompanying claims and equivalents thereof.

What is claimed is:

1. A reproducing apparatus to reproduce data from a recording medium, the apparatus comprising:
   a reading unit to reproduce the data from the recording medium; and
   a controller to control the reading unit to reproduce user data from a data area and to reproduce replacement data replacing defective areas of the data area using ith temporary defect information read from a temporary defect management area of the recording medium comprising recorded information regarding a defect generated according to an ith recording operation, and ith temporary defect management information read from the temporary defect management area which the controller uses to manage the ith temporary defect information,
   wherein:
      the ith temporary defect management information includes an address of a last recorded unit of user data in the data area, and
      i is an index.

2. The apparatus of claim 1, wherein the controller detects, from a drive & disc information area of the recording medium, information regarding locations of the ith temporary defect information and the temporary defect management information.

3. The apparatus of claim 1, wherein during the recording of the ith temporary defect management information, the ith temporary defect management information is recorded to further include location information of a test area of the recording medium and/or write protect information of the recording medium.

4. The apparatus of claim 2, wherein the recording medium further comprises repeated recordings of the ith temporary defect information, the ith temporary defect management information, and the information regarding the locations while increasing the index i given to the recording operation, the temporary defect information, and the temporary defect management information.

5. The apparatus of claim 1, wherein the address of the last recorded unit of user data comprises a physical sector number of the last physical sector in the data area recorded with the user data.

6. The apparatus of claim 1, wherein the recording medium is a write once disc.

7. The apparatus of claim 1, wherein the recording medium further comprises a last recorded one of the temporary defect information and temporary defect management information, which are lastly recorded in the temporary defect management area, recorded in a defect management area of the recording medium for finalization of the recording medium.

8. The apparatus of claim 1, wherein the ith temporary defect management information is recorded to further include an address of a last recorded unit of replacement data which was recorded in a spare area of the recording medium to replace a defective area of the recording medium.

9. The apparatus of claim 1, wherein the ith temporary defect management information is recorded to further include position information of a replacement area in a spare area of the recording medium to be next recorded.

10. The apparatus of claim 9, wherein the position information of the replacement area comprises a physical sector number of next usable spare cluster in the spare area.

11. The apparatus of claim 1, wherein the ith temporary defect information comprises stored information that points to the defective area and information that points to a replacement area for the defective area as the ith temporary defect information in a memory.

* * * * *